US012562935B2

(12) United States Patent
Hu et al.

(10) Patent No.: US 12,562,935 B2
(45) Date of Patent: Feb. 24, 2026

(54) HOME DEVICE CONTROL METHOD, TERMINAL DEVICE, AND COMPUTER-READABLE STORAGE MEDIUM

(71) Applicant: Petal Cloud Technology Co., Ltd., Dongguan (CN)

(72) Inventors: Zifu Hu, Nanjing (CN); Caixia Miao, Shenzhen (CN); Feng Zhou, Nanjing (CN); Wenjin Zou, Shanghai (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 344 days.

(21) Appl. No.: 18/004,463

(22) PCT Filed: Jul. 1, 2021

(86) PCT No.: PCT/CN2021/104078
§ 371 (c)(1),
(2) Date: Jan. 6, 2023

(87) PCT Pub. No.: WO2022/007707
PCT Pub. Date: Jan. 13, 2022

(65) Prior Publication Data
US 2024/0291685 A1 Aug. 29, 2024

(30) Foreign Application Priority Data
Jul. 7, 2020 (CN) .......................... 202010655225.6

(51) Int. Cl.
*H04L 12/28* (2006.01)
*G05B 13/02* (2006.01)
(Continued)

(52) U.S. Cl.
CPC .......... *H04L 12/282* (2013.01); *G05B 13/027* (2013.01); *G06F 3/04815* (2013.01);
(Continued)

(58) Field of Classification Search
CPC . H04L 12/282; H04L 67/125; H04L 12/2809; G05B 13/027; G05B 2219/2642;
(Continued)

(56) References Cited

U.S. PATENT DOCUMENTS

2018/0054487 A1 2/2018 Hebsur et al.
2018/0157398 A1* 6/2018 Kaehler ............... G06V 10/464
(Continued)

FOREIGN PATENT DOCUMENTS

CN 102663448 A 9/2012
CN 109196825 A 1/2019
(Continued)

*Primary Examiner* — Charles R Kasenge
(74) *Attorney, Agent, or Firm* — Conley Rose, P.C.

(57) ABSTRACT

A method includes obtaining an image corresponding to a target area for control of a home device, determining a target home device based on the image, obtaining a control menu corresponding to the target home device, displaying the control menu in the image using an augmented reality (AR) technology, and controlling, in response to a selection operation in the control menu, the target home device to execute a target control instruction corresponding to the selection operation.

20 Claims, 17 Drawing Sheets

(51) Int. Cl.

| | |
|---|---|
| *G06F 3/04815* | (2022.01) |
| *G06F 3/0482* | (2013.01) |
| *G06F 3/0484* | (2022.01) |
| *G06T 19/00* | (2011.01) |
| *G06V 10/44* | (2022.01) |
| *G06V 10/75* | (2022.01) |
| *G06V 10/774* | (2022.01) |
| *G06V 10/82* | (2022.01) |
| *G06V 20/20* | (2022.01) |
| *H04L 67/125* | (2022.01) |

(52) U.S. Cl.

CPC .......... *G06F 3/0482* (2013.01); *G06F 3/0484* (2013.01); *G06T 19/006* (2013.01); *G06V 10/454* (2022.01); *G06V 10/75* (2022.01); *G06V 10/774* (2022.01); *G06V 10/82* (2022.01); *G06V 20/20* (2022.01); *H04L 67/125* (2013.01); *G06T 2200/24* (2013.01)

(58) Field of Classification Search

CPC ... G05B 15/02; G05B 19/418; G06F 3/04815; G06F 3/0482; G06F 3/0484; G06T 19/006; G06T 2200/24; G06V 10/454; G06V 10/75; G06V 10/774; G06V 10/82; G06V 20/20; H04W 4/80; H04W 12/06

See application file for complete search history.

(56) References Cited

U.S. PATENT DOCUMENTS

| | | | |
|---|---|---|---|
| 2020/0104649 A1 | 4/2020 | Xu | |
| 2020/0125829 A1 | 4/2020 | Cox et al. | |
| 2020/0192613 A1 | 6/2020 | Brady et al. | |
| 2020/0226383 A1* | 7/2020 | Meier | .................... G06V 10/17 |

FOREIGN PATENT DOCUMENTS

| | | |
|---|---|---|
| CN | 110383274 A | 10/2019 |
| CN | 111045344 A | 4/2020 |
| EP | 2996015 A1 | 3/2016 |
| JP | 2011044046 A | 3/2011 |

* cited by examiner

HOME DEVICE CONTROL METHOD, TERMINAL DEVICE, AND COMPUTER-READABLE STORAGE MEDIUM

CROSS-REFERENCE TO RELATED APPLICATIONS

This is a U.S. National Stage of International Patent Application No. PCT/CN2021/104078 filed on Jul. 1, 2021, which claims priority to Chinese Patent Application No. 202010655225.6 filed on Jul. 7, 2020. Both of the aforementioned applications are hereby incorporated by reference in their entireties.

TECHNICAL FIELD

This application pertains to the field of terminal technologies, and in particular, relates to a home device control method, a terminal device, and a computer-readable storage medium

BACKGROUND

With the development of internet of things (internet of things, IoT) technologies, functions of home devices are increasingly rich, and intelligent control on the home devices is increasingly important. In the conventional technology, an application (application, APP) may be usually installed in a terminal device for intelligent control on a home device. However, when performing intelligent control on the home device by using the application, a user needs to start the application to find the home device that needs to be controlled, then open a device control page corresponding to the home device to find a corresponding control menu, and perform intelligent control on the home device by triggering a corresponding menu item in the control menu. Consequently, an operation procedure is complex, and control efficiency is low.

SUMMARY

Embodiments of this application provide a home device control method, a terminal device, and a computer-readable storage medium, to simplify a home device control procedure and improve home device control efficiency.

According to a first aspect, an embodiment of this application provides a home device control method, applied to a terminal device. The method may include:

obtaining an image corresponding to a target area, and determining a target home device based on the image;

obtaining a control menu corresponding to the target home device, and displaying the control menu in the image by using an augmented reality AR technology; and controlling, in response to a selection operation in the control menu, the target home device to execute a target control instruction corresponding to the selection operation.

In an example, the terminal device may be directly connected to the target home device. For example, the terminal device may establish a short-distance communication connection to the target home device. The short-distance communication connection may be a Bluetooth connection, a near field communication (Near Field Communication, NFC) connection, a wireless fidelity (Wireless Fidelity, Wi-Fi) connection, a ZigBee (ZigBee) connection, or the like. Herein, after the terminal device detects a selection operation performed by a user on a menu item in the control menu, the terminal device may directly send, to the target home device, a target control instruction corresponding to the menu item, to instruct the target home device to execute the target control instruction. The target control instruction may be an instruction for turning on the target home device, an instruction for turning off the target home device, an instruction for adjusting a volume of the target home device, or the like.

In another example, the terminal device and the target home device may be separately connected to a cloud. Therefore, after the terminal device detects a selection operation performed by a user on a menu item in the control menu, the terminal device may send, to the cloud, a target control instruction corresponding to the menu item. After receiving the target control instruction, the cloud may address a device control channel corresponding to the target home device, and send the target control instruction to the target home device through the device control channel, to instruct the target home device to execute the target control instruction.

According to the foregoing home device control method, when a home device needs to be controlled, the terminal device may obtain an image corresponding to a target area, and may determine, based on the image, the target home device that needs to be controlled. Then, a control menu corresponding to the target home device may be obtained, and the control menu is displayed in the image by using the AR technology, that is, both the target home device and the control menu corresponding to the target home device are displayed in the image, so that the user can directly trigger a corresponding menu item in the control menu to control the target home device. This can simplify a home device control procedure, and improve home device control efficiency. In addition, the user controls the target home device by directly performing an operation on the control menu in the image in which the target home device and the control menu are displayed, which is the same as that the user directly controls the home device in an actual scenario. This implements an objective that what the user sees is what the user controls, greatly improves interactive performance in home device control, improves user experience, and has strong usability and practicability.

In a possible implementation of the first aspect, the determining a target home device based on the image may include:

performing device detection on the image, and obtaining a device feature of a detected home device; and matching the device feature against a preset device feature in a device feature library to obtain a first matching result, and determining the target home device based on the first matching result.

It should be noted that the device feature library may be a pre-established feature library, and the device feature library may include preset device features corresponding to a plurality of home devices. A corresponding index may be established between each preset device feature in the device feature library and a corresponding home device, so that the target home device may be determined by using the index, to improve efficiency of determining the target home device.

For example, the terminal device may establish the device feature library based on each home device of an entity. Specifically, for each home device, the terminal device may first obtain a device identifier such as a device name and/or a device number corresponding to the home device, and may start a camera of the terminal device to perform 360-degree image scanning on the home device, that is, obtain device images corresponding to the home device from different angles. Then, the terminal device may separately extract, from each obtained device image, each preset device feature corresponding to the home device, that is, separately extract the preset device feature corresponding to each device image, separately store the preset device feature corresponding to each device image as a whole into the device feature library, and establish an index between the home device and each preset device feature, that is, establish an index between the device identifier such as the device name and/or the device number corresponding to the home device and the preset device feature corresponding to each device image. Herein, the device feature library is established by performing 360-degree feature extraction on the home device, so that 360-degree field-of-view matching can be performed during device feature matching, to improve device feature matching precision and accuracy of determining the target home device.

In another possible implementation of the first aspect, the determining a target home device based on the image may include:

performing device detection on the image, and obtaining a device feature of a detected home device and an environment feature of an environment in which the home device is located;

matching the device feature against a preset device feature in a device feature library to obtain a first matching result, and matching the environment feature against a preset environment feature in an environment feature library to obtain a second matching result; and determining the target home device based on the first matching result and the second matching result.

It should be understood that, when the user has two or more same home devices, the terminal device may determine the target home device with reference to an environment feature of an environment in which each home device is located. The environment feature library may be a pre-established feature library. The environment feature library may include a preset environment feature of the environment in which each home device is located.

It should be understood that, before the matching the device feature against a preset device feature in a device feature library, the method may include:

obtaining a three-dimensional model of the home device, where the home device includes the target home device;

for each three-dimensional model, obtaining, from different angles, model images corresponding to the three-dimensional model, and separately extracting a preset device feature from each model image, and establishing the device feature library based on the preset device feature corresponding to each model image.

For example, the terminal device may establish the device feature library based on the three-dimensional 3D model of the home device. Specifically, for each home device, the terminal device may first obtain the device identifier corresponding to the home device, and may obtain the 3D model of the home device from the cloud based on the device identifier. Then, the terminal device may obtain, from different angles, the model images corresponding to the 3D model. Next, the terminal device may separately extract, from each obtained model image, each preset device feature corresponding to the home device, that is, separately extract the preset device feature corresponding to each model image, and may separately store the preset device feature corresponding to the model image as a whole into the device feature library, and establish an index between the home device and each preset device feature.

In a possible implementation of the first aspect, the determining a target home device based on the image may include:

inputting the image into a trained neural network model for processing, to obtain a device identifier output by the neural network model, and determining the target home device based on the device identifier.

In another possible implementation of the first aspect, the determining the target home device based on the device identifier may include:

obtaining an environment feature corresponding to the image, and matching the environment feature against a preset environment feature in an environment feature library, to obtain a third matching result; and determining the target home device based on the device identifier and the third matching result.

It should be understood that, before the inputting the image into a trained neural network model for processing, the method may include:

obtaining a three-dimensional model of the home device, where the home device includes the target home device;

for each three-dimensional model, obtaining, from different angles, model images corresponding to the three-dimensional model; and inputting each model image and a device identifier of a home device corresponding to each model image into an initial neural network model for training, to obtain the trained neural network model.

Herein, the terminal device may also determine the to-be-controlled target home device based on the trained neural network model. Specifically, the terminal device may input the obtained image into the trained neural network model for processing, to obtain a device identifier output by the neural network model, and may determine the target home device based on the device identifier. The neural network model may be a neural network model established based on a tensor flow (TensorFlow).

In this embodiment, the terminal device may train the neural network model based on each home device of the entity. Specifically, for each home device, the terminal device may enable a camera of the terminal device to perform 360-degree image scanning on the home device, that is, may obtain, from different angles, device images corresponding to the home device, and may obtain a device identifier corresponding to the home device, for example, may input the device identifier by the user. Then, the terminal device may input each device image and the device identifier of the home device corresponding to each device image into the initial neural network model for training, to obtain the trained neural network model. Herein, 360-degree images of each home device are obtained, and the neural network model is trained by using the obtained device images, so that the neural network model obtained through training can perform 360-degree field-of-view matching, to improve accuracy of determining the target home device.

In this embodiment, the terminal device may also train the neural network model based on the 3D model of each home device. In other words, the neural network model is trained by obtaining the model images corresponding to the 3D model.

For example, the obtaining a control menu corresponding to the target home device, and displaying the control menu in the image by using an augmented reality AR technology may include:

obtaining the control menu and a device status that are corresponding to the target home device, and displaying the control menu and the device status in the image by using the AR technology.

In this embodiment, to improve control efficiency of the target home device, when obtaining the control menu corresponding to the target home device, the terminal device may further obtain the device status corresponding to the target home device, and may display the device status in the image by using the AR technology, so that the user can correctly control the target home device based on the device status, to improve control efficiency of the target home device and improve user experience.

In a possible implementation of the first aspect, the determining a target home device based on the image may include:

sending the image to a cloud, to indicate the cloud to determine the target home device based on the image, and send the determined target home device to the terminal device.

In this embodiment, the terminal device may alternatively send the obtained image to the cloud, so that the cloud determines the target home device, to reduce processing performance of the terminal device, improve efficiency of determining the target home device, and further improve home device control efficiency.

In an example, the cloud may determine the to-be-controlled target home device based on the device feature in the image. Specifically, the cloud may first perform device detection on the image to detect a home device in the image. Then, feature extraction may be performed on the home device in the image, to extract a device feature of the home device, and the extracted device feature may be matched against a preset device feature in a device feature library, to obtain a first matching result, so that the to-be-controlled target home device may be determined based on the first matching result.

In another example, the cloud may alternatively determine the to-be-controlled target home device based on a trained neural network model. Specifically, the cloud may input the image into the trained neural network model for processing, to obtain a device identifier output by the neural network model, and may determine the target home device based on the device identifier.

For example, the obtaining a control menu corresponding to the target home device may include:

sending the device identifier of the target home device to the cloud, to indicate the cloud to obtain, based on the device identifier, a device capability description file corresponding to the target home device and send the device capability description file to the terminal device; and generating, based on the device capability description file, the control menu corresponding to the target home device.

According to a second aspect, an embodiment of this application provides a home device control apparatus, used in a terminal device. The apparatus may include:

a device determining module, configured to: obtain an image corresponding to a target area, and determine a target home device based on the image;

a menu display module, configured to: obtain a control menu corresponding to the target home device, and display the control menu in the image by using an augmented reality AR technology, and a device control module, configured to: control, in response to a selection operation in the control menu, the target home device to execute a target control instruction corresponding to the selection operation.

In a possible implementation of the second aspect, the device determining module may include:

a first device detection unit, configured to: perform device detection on the image, and obtain a device feature of a detected home device; and a first feature matching unit, configured to: match the device feature against a preset device feature in a device feature library to obtain a first matching result, and determine the target home device based on the first matching result.

In another possible implementation of the second aspect, the device determining module may include:

a second device detection unit, configured to: perform device detection on the image, and obtain a device feature of a detected home device and an environment feature of an environment in which the home device is located;

a second feature matching unit, configured to: match the device feature against a preset device feature in a device feature library to obtain a first matching result, and match the environment feature against a preset environment feature in an environment feature library to obtain a second matching result; and a target device determining unit, configured to: determine the target home device based on the first matching result and the second matching result.

It should be understood that the apparatus may further include:

a first three-dimensional model module, configured to: obtain a three-dimensional model of the home device, where the home device includes the target home device;

a first model image obtaining module, configured to: for each three-dimensional model, obtain, from different angles, model images corresponding to the three-dimensional model, and a device feature library establishment module, configured to: separately extract a preset device feature from each model image, and establish the device feature library based on the preset device feature corresponding to each model image.

In a possible implementation of the second aspect, the device determining module may include:

an image input unit, configured to: input the image into a trained neural network model for processing, to obtain a device identifier output by the neural network model, and determine the target home device based on the device identifier.

In another possible implementation of the second aspect, the image input unit may include:

an environment feature matching subunit, configured to: obtain an environment feature corresponding to the image, and match the environment feature against a preset environment feature in an environment feature library, to obtain a third matching result; and a target home device determining subunit, configured to: determine the target home device based on the device identifier and the third matching result.

It should be understood that the apparatus may further include:

a second three-dimensional model module, configured to:
obtain a three-dimensional model of the home device,
where the home device includes the target home
device;

a second model image obtaining module, configured to:
for each three-dimensional model, obtain, from differ-
ent angles, model images corresponding to the three-
dimensional model; and a neural network model training module, configured to:
input each model image and a device identifier of a
home device corresponding to each model image into
an initial neural network model for training, to obtain
the trained neural network model.

For example, the menu display module may be further
configured to: obtain the control menu and a device status
that are corresponding to the target home device, and display
the control menu and the device status in the image by using
the AR technology.

In a possible implementation of the second aspect, the
device determining module may further include:

an image sending unit, configured to: send the image to a
cloud, to indicate the cloud to determine the target
home device based on the image, and send the deter-
mined target home device to the terminal device.

For example, the menu display module may include:

a device identifier sending unit, configured to: send a
device identifier of the target home device to the cloud,
to indicate the cloud to obtain, based on the device
identifier, a device capability description file corre-
sponding to the target home device and send the device
capability description file to the terminal device; and a control menu generation unit, configured to: generate,
based on the device capability description file, the
control menu corresponding to the target home device.

According to a third aspect, an embodiment of this
application provides a terminal device, including a memory,
a processor, and a computer program that is stored in the
memory and can be run on the processor. When the proces-
sor executes the computer program, the terminal device is
enabled to implement the home device control method
according to any possible implementation of the first aspect.

According to a fourth aspect, an embodiment of this
application provides a computer-readable storage medium.
The computer-readable storage medium stores a computer
program. When the computer program is executed by a
computer, the computer is enabled to implement the home
device control method according to any possible implemen-
tation of the first aspect.

According to a fifth aspect, an embodiment of this appli-
cation provides a computer program product. When the
computer program product is run on a terminal device, the
terminal device is enabled to perform the home device
control method according to any possible implementation of
the first aspect.

It should be understood that, for beneficial effects of the
second aspect to the fifth aspect, refer to related descriptions
in the first aspect. Details are not described herein agam.

DESCRIPTION OF EMBODIMENTS

Figure 1:
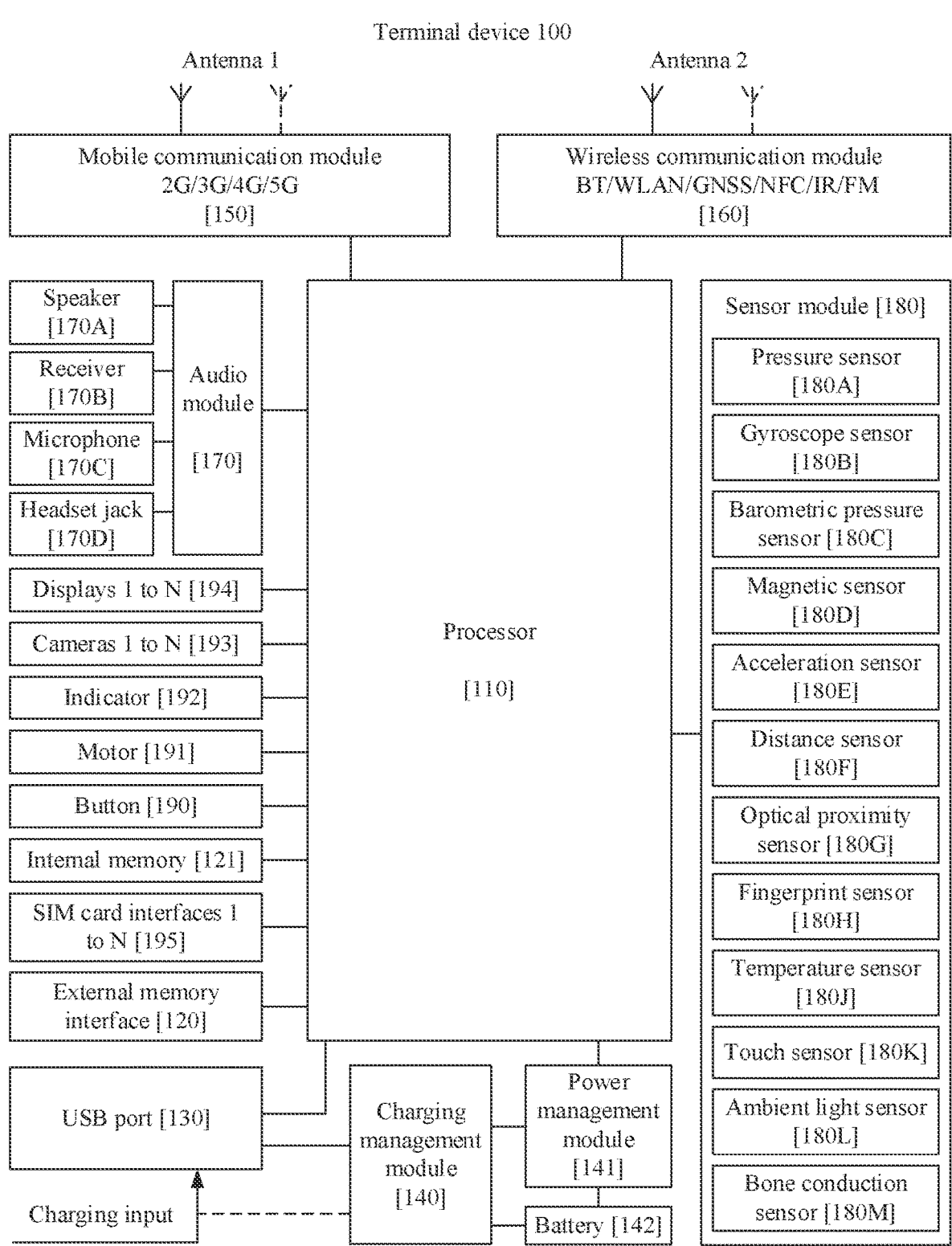
FIG. 1 is a schematic diagram of a structure of a terminal
device according to an embodiment of this application.

It should be understood that, when used in the specifica-
tion and the appended claims of this application, the term
"include" indicates presence of the described features,
entireties, steps, operations, elements, and/or components,
but does not exclude presence or addition of one or more
other features, entireties, steps, operations, elements, com-
ponents, and/or sets thereof.

It should also be understood that the term "and/or" used
in the specification and the appended claims of this appli-
cation refers to any combination and all possible combina-
tions of one or more associated listed items, and includes
these combinations.

As used in the specification and the appended claims of
this application, according to the context, the term "if" may
be interpreted as "when" or "once" or "in response to
determining" or "in response to detecting". Similarly,
according to the context, the phrase "if it is determined that"
or "if (a described condition or event) is detected" may be
interpreted as a meaning of "once it is determined that" or
"in response to determining" or "once (the described con-
dition or event) is detected" or "in response to detecting (the
described condition or event)".

In addition, in the descriptions of the specification and
claims of this application, the terms "first", "second",
"third", and the like are merely intended for a purpose of
differentiated description, but shall not be understood as an
indication or an implication of relative importance.

Reference to "an embodiment", "some embodiments", or
the like described in the specification of this application
indicates that one or more embodiments of this application
include a specific feature, structure, or characteristic
described with reference to those embodiments. Therefore,
in this specification, statements, such as "in an embodi-
ment", "in some embodiments", "in some other embodi-
ments", and "in other embodiments", that appear at different
places do not necessarily mean referring to a same embodi-
ment. Instead, the statements mean referring to "one or more
but not all embodiments", unless otherwise specifically
emphasized in other ways. Terms "include", "contain",
"have", and variants of the terms all mean "include but are
not limited to", unless otherwise specifically emphasized in
other ways.

With the development of internet of things (internet of
things, IoT) technologies, functions of home devices are
increasingly rich, and intelligent control on the home
devices is increasingly important. In the conventional tech-
nology, intelligent control on a home device may usually include the following two manners: (1) The intelligent control on the home device is performed by using an application installed in a terminal device. (2) The intelligent control on the home device is performed through a voice.

Currently, when the intelligent control on the home device is performed by using an application, a user needs to first start the application to find the home device that needs to be controlled in an application interface, open a device control page corresponding to the home device to find a corresponding control menu on the device control page, and trigger a menu item in the control menu. After detecting a trigger operation performed by the user on a specific menu item, the terminal device may send, to an IoT cloud, a control instruction corresponding to the menu item (for example, a control instruction for turning on the home device or a control instruction for turning off the home device). After receiving the control instruction, the IoT cloud may address a device control channel corresponding to the home device, and send the control instruction to the home device through the device control channel. After receiving the control instruction, the home device may execute the control instruction, to implement the intelligent control on the home device. It is clear that in the existing manner of performing intelligent control on a home device by using an application, an operation procedure is complicated, control efficiency is low, w % bat the user sees is what the user controls cannot be implemented, interactive performance is poor, and user experience is affected.

When the intelligent control on the home device is performed through the voice, a user needs to input a control voice to a terminal device such as a smart speaker. After receiving the control voice, the terminal device such as the smart speaker may perform voice-to-semantic conversion processing on the control voice by using a voice system, then perform intention recognition on semantics, and send a recognized control instruction (for example, a control instruction for turning on a home device A or a control instruction for turning off a home device B) to an IoT cloud. The IoT cloud may determine a to-be-controlled home device based on the control instruction, then address a device control channel corresponding to the home device, and send the control instruction to the home device through the device control channel. After receiving the control instruction, the home device may execute the control instruction, to implement the intelligent control on the home device. Although this manner of performing intelligent control on a home device through a voice can simplify a control procedure of the home device to some extent, the user still needs to record the control voice or a keyword, and once the user cannot remember the control voice or the keyword, control efficiency of the home device is low. In addition, what the user sees is what the user controls cannot be implemented in voice control, interactive performance is poor, and user experience is affected.

To resolve the foregoing problems, embodiments of this application provide a home device control method, a terminal device, and a computer-readable storage medium. When a home device needs to be controlled, an image corresponding to an area in which the home device is located (namely, a target area described below) may be obtained, and the target home device that needs to be controlled may be determined based on the image. Then, a control menu corresponding to the target home device may be obtained, and the control menu is displayed in the image by using an AR technology, that is, both the target home device and the control menu corresponding to the target home device are displayed in the image, so that a user can directly trigger a corresponding menu item in the control menu to control the target home device. This can simplify a home device control procedure, and improve home device control efficiency. In addition, the user may control the target home device by directly performing an operation on the control menu in the image in which the target home device and the control menu are displayed, which is the same as that the user directly controls the home device in an actual scenario. This implements an objective that what the user sees is what the user controls, greatly improves interactive performance in home device control, improves user experience, and has strong usability and practicability.

In embodiments of this application, the terminal device may be a terminal device that has a camera apparatus, such as a mobile phone, a tablet computer, a wearable device, a notebook computer, an augmented reality (augmented reality, AR) device/virtual reality (virtual reality, VR) device, an ultra-mobile personal computer (ultra-mobile personal computer, UMPC), a netbook, a personal digital assistant (personal digital assistant, PDA), or a desktop computer. A specific type of the terminal device is not limited in embodiments of this application.

The following first describes the terminal device in embodiments of this application. FIG. 1 is a schematic diagram of a structure of the terminal device 100.

The terminal device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used to perform asynchronous communication. The bus may be a two-way communication bus. The bus converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be used to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement an image shooting function of the terminal device 100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be used to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB type-C port, or the like. The USB port 130 may be used to connect to the charger to charge the terminal device 100, or may be used to transmit data between the terminal device 100 and a peripheral device, or may be used to connect to a headset for playing audio through the headset. The interface may alternatively be used to connect to another terminal device, for example, an AR device.

It may be understood that an interface connection relationship between the modules that is shown in this embodiment of the present invention is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB port 130. In some embodiments of wireless charging, the charging management module 140 may receive a wireless charging input by using a wireless charging coil of the terminal device 100. When charging the battery 142, the charging management module 140 may further supply power to the terminal device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is used in the terminal device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the terminal device 100. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communication module 150, and the antenna 2 thereof is coupled to the wireless communication module 160, so that the terminal device 100 can communicate with a network and another device by using a wireless communication technology. The wireless communication technology may include a global system for mobile communications (global system for mobile communications, GSM), a general packet radio service (general packet radio service. GPRS), code division multiple access (code division multiple access. CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLO-NASS), a BeiDou navigation satellite system (BeiDou navigation satellite system. BDS), a quasi-zenith satellite system (quasi-zenith satellite system. QZSS), and/or satellite based augmentation systems (satellite based augmentation systems, SBAS).

The terminal device 100 implements a display function by using a GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the terminal device 100 may include one or N displays 194, where N is a positive integer greater than 1.

The terminal device 100 may implement an image shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more types of video codecs. In this way, the terminal device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the terminal device 100, such as image recognition, facial recognition, speech recognition, and text understanding.

The external memory interface 120 may be configured to connect to an external memory card, for example, a micro SD card, to extend a storage capability of the terminal device 100. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the terminal device 100. In addition, the internal memory 121 may include a high-speed random access memory, or may include a nonvolatile memory, for example, at least one magnetic disk storage device, a flash memory, or a universal flash storage (universal flash storage, UFS). The processor 110 performs various function applications and data processing of the terminal device 100 by running the instructions stored in the internal memory 121 and/or the instructions stored in the memory disposed in the processor.

The terminal device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The terminal device 100 may be used to listen to music or answer a hands-free call through the speaker 170A.

The receiver 170B, also referred to as an "earpiece", is configured to convert an audio electrical signal into a sound signal. When a call is answered or voice information is received through the terminal device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, implement noise reduction, and identify a sound source, to implement a directional recording function and the like.

The headset jack 170D is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed in the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal device 100 determines pressure strength based on a capacitance change. When a touch operation is performed on the display 194, the terminal device 100 detects intensity of the touch operation based on the pressure sensor 180A. The terminal device 100 may further calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating an SMS message is performed.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyroscope sensor 180B may also be used in a navigation scenario and a somatic game scenario.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall sensor. The terminal device 100 may detect opening and closing of a flip cover by using the magnetic sensor 180D. In some embodiments, when the terminal device 100 is a flip phone, the terminal device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the terminal device 100. A magnitude and a direction of gravity may be detected when the terminal device 100 is stationary. The acceleration sensor 180E may be further configured to identify a posture of the terminal device, and is used in an application such as switching between a landscape mode and a portrait mode or a pedometer.

The distance sensor 180F is configured to measure a distance. The terminal device 100 may measure a distance by using infrared light or a laser. In some embodiments, in an image shooting scenario, the terminal device 100 may measure a distance by using the distance sensor 180F, to implement fast focusing.

For example, the optical proximity sensor 180G may include a light-emitting diode (LED) and an optical detector, for example, a photodiode. The light-emitting diode may be an infrared light-emitting diode. The terminal device 100 emits infrared light outward by using the light-emitting diode. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear for a call, to automatically turn off a screen for power saving. The optical proximity sensor 180G may also be used in a flip cover mode or a pocket mode to automatically perform screen unlocking or locking.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused by a low temperature. In some other embodiments, when the temperature is lower than still another threshold, the terminal device 100 boosts an output voltage of the battery 142, to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. The display 194 may provide a visual output related to the touch operation. In some other embodiments, the touch sensor 180K may alternatively be disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive a button input, and generate a button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may also be compatible with different types of SIM cards. The SIM card interface 195 may also be compatible with an external storage card. The terminal device 100 interacts with a network through the SIM card, to implement functions such as calling and data communication. In some embodiments, the terminal device 100 uses an eSIM, namely, an embedded SIM card. The eSIM card may be embedded in the terminal device 100, and cannot be separated from the terminal device 100.

A software system of the terminal device 100 may use a layered architecture, an event-driven architecture, a microkernel architecture, a microservice architecture, or a cloud architecture. In embodiments of the present invention, an Android system with a layered architecture is used as an example to describe a software structure of the terminal device 100.

Figure 2:
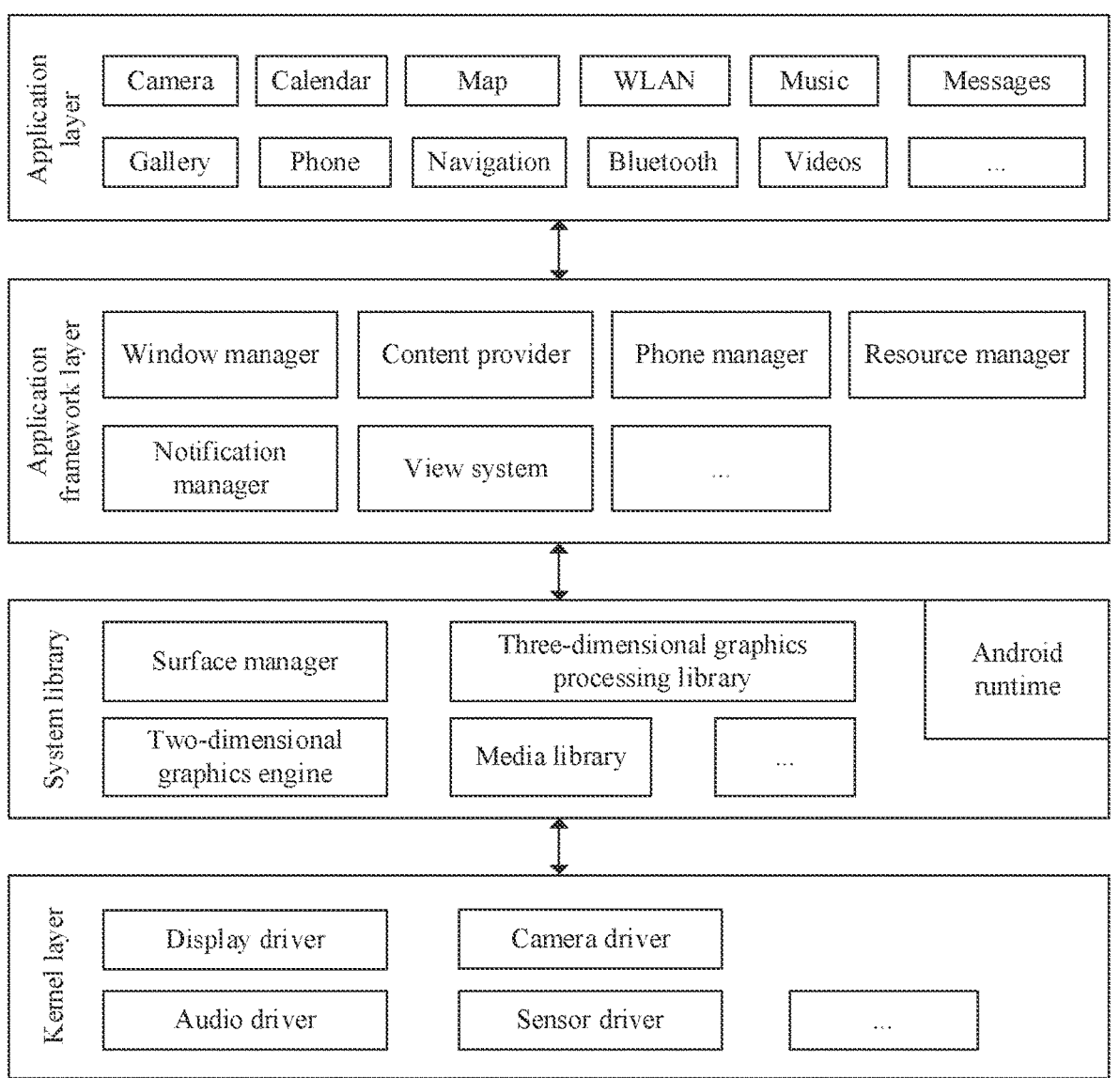
FIG. 2 is a schematic diagram of a software architecture
of a terminal device according to an embodiment of this
application.

FIG. 2 is a block diagram of a software structure of the terminal device 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmark, a phone book, and the like.

The view system includes visual controls such as a control for displaying text and a control for displaying an image. The view system may be configured to establish an application. A display interface may include one or more views. For example, a display interface including an SMS message notification icon may include a view for displaying text and a view for displaying an image.

The phone manager is configured to provide a communication function of the terminal device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The displayed notification information may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, a prompt tone is produced, the terminal device vibrates, or an indicator light blinks.

The Android runtime includes a core library and a virtual machine. The Android runtime is responsible for scheduling and management of the Android system.

The core library includes two parts: a function that needs to be invoked in Java language, and a core library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of function modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal device 100 with reference to a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch operation, and a control corresponding to the touch operation is a control of a camera application icon is used. A camera application invokes an interface of the application framework layer to start the camera application, so that the camera driver is started by invoking the kernel layer, and a static image or a video is captured through the camera 193.

The following describes in detail, with reference to a specific application scenario, the home device control method provided in embodiments of this application.

Embodiment 1

Figure 3:
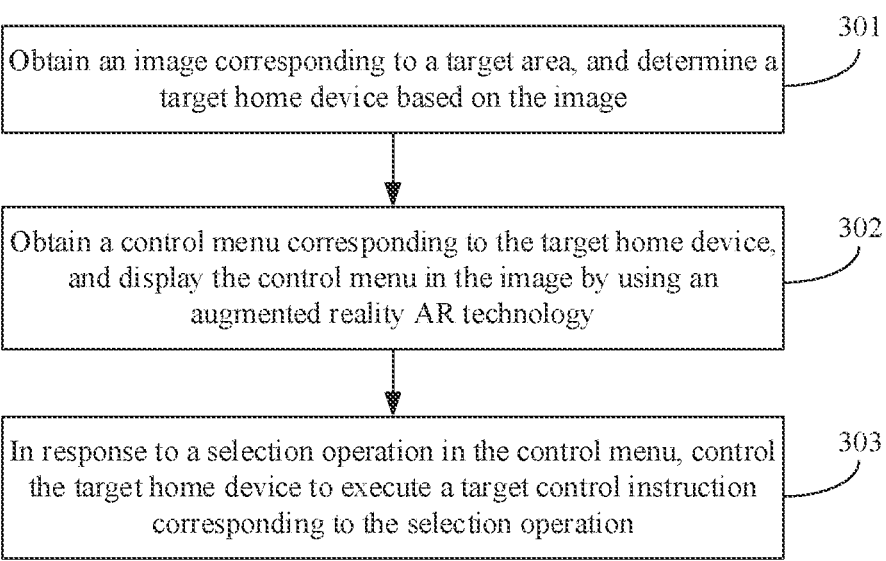
FIG. 3 is a schematic flowchart of a home device control
method according to an embodiment 1 of this application.

FIG. 3 is a schematic flowchart of a home device control method according to the embodiment 1 of this application. This embodiment may be executed by a terminal device having the foregoing software and hardware. As shown in FIG. 3, the method in this embodiment of this application may include the following steps.

S301: Obtain an image corresponding to a target area, and determine a target home device based on the image.

In this embodiment, a home device may be a device such as a light, a television, a refrigerator, a washing machine, a sound box, an air conditioner, a fan, or an electric cooker, and the target home device may be at least one of the home devices. When a user wants to perform intelligent control on the home device by using a terminal device, the user may enable an intelligent control function of the terminal device. The intelligent control function described in this application is a function of controlling the home device by using the method provided in this application. After the intelligent control function of the terminal device is enabled, the terminal device may collect, by using a camera of the terminal device, an image of an area (namely, the target area) in which the home device is located, where the collected image may include an image of the home device. Then, the terminal device may determine, based on the image collected by the camera, the target home device that the user wants to control. A process in which the terminal device determines the target home device based on the image is described in detail in subsequent content.

For example, an application for intelligent control on the home device may be installed on the terminal device. When the user wants to perform intelligent control on the home device, the user may open the application. After the application is enabled, a "scan" icon or button may be displayed on an interface of the application. The user may tap the icon or button to enable an intelligent control function of the terminal device, and may make the camera of the terminal device face the target area. After detecting that the icon or button is triggered, the terminal device may automatically enable the camera of the terminal device, to perform image collection on the target area by using the camera. The collected image may be synchronously displayed on a display interface of the terminal device.

For example, a preset gesture for enabling the intelligent control function of the terminal device may be set in the terminal device. The preset gesture may be any gesture different from a conventional function gesture in the terminal device. The preset gesture may be a gesture executed on the display interface of the terminal device, or may be a gesture executed in a collection range of the camera. A specific type of the preset gesture is not limited in this embodiment. When the user wants to perform intelligent control on the home device, the user may enable the intelligent control function of the terminal device by using the preset gesture. In other words, after the terminal device detects the preset gesture, the terminal device may determine that the intelligent control function for the home device needs to be enabled, and may automatically enable the camera of the terminal device, to collect the image of the target area by using the camera.

S302: Obtain a control menu corresponding to the target home device, and display the control menu in the image by using an augmented reality AR technology.

In an example, the terminal device may obtain, from a preset storage apparatus, the control menu corresponding to the target home device. The preset storage apparatus may be an internal storage apparatus of the terminal device, or may be an external storage apparatus (for example, a cloud) connected to the terminal device. That is, in this embodiment, a control menu corresponding to each home device and a device identifier corresponding to the home device may be associated and stored in the preset storage apparatus in advance. After the terminal device determines the target home device based on the image, the terminal device may obtain, from the preset storage apparatus based on a device identifier corresponding to the target home device, the control menu corresponding to the target home device.

In another example, the terminal device may obtain the control menu corresponding to the target home device by performing image analysis on the obtained image. That is, in a scenario in which the control menu is integrated into the target home device, the image obtained by the terminal device may include an image of the control menu corresponding to the target home device. Therefore, the terminal device may obtain the control menu corresponding to the target home device by recognizing and analyzing the image. The image may be recognized and analyzed by using an existing image recognition and analysis method, which is not limited in this embodiment.

In another example, the terminal device may obtain, by using the cloud connected to the target home device, a device capability description file profile corresponding to the target home device, that is, may send the device identifier of the target home device to the cloud, to indicate the cloud to obtain, based on the device identifier, the device profile corresponding to the target home device and send the device profile to the terminal device. The terminal device may generate, based on the device profile, the control menu corresponding to the target home device. The device profile is a file that describes a capability feature of the device, namely, a file that describes what the device is, what the device can do, and how to control the device. The capability feature of the device may include an identification attribute of the device and a provided service Service. The identification attribute may include a device type and the like. The Service may be a function module provided by the device, and may include a command and an attribute. For example, a Service of a light bulb may include a switch SWITCH Service, where the SWITCH Service may have a SWITCH ON command and a SWITCH OFF command, and may have a current switch status status (ON, OFF) attribute. Therefore, after obtaining the device profile corresponding to the target home device, the terminal device may parse the device profile to obtain the capability feature corresponding to the target home device, so as to generate, based on the capability feature, the control menu corresponding to the target home device.

It should be noted that, for specific descriptions of the device profile, refer to the conventional technology. This is not limited in this embodiment.

In this embodiment, after obtaining the control menu corresponding to the target home device, the terminal device may display the control menu in the image by using the AR technology, so that the user can control the target home device by performing an operation on the control menu displayed in the image.

Figure 4A:
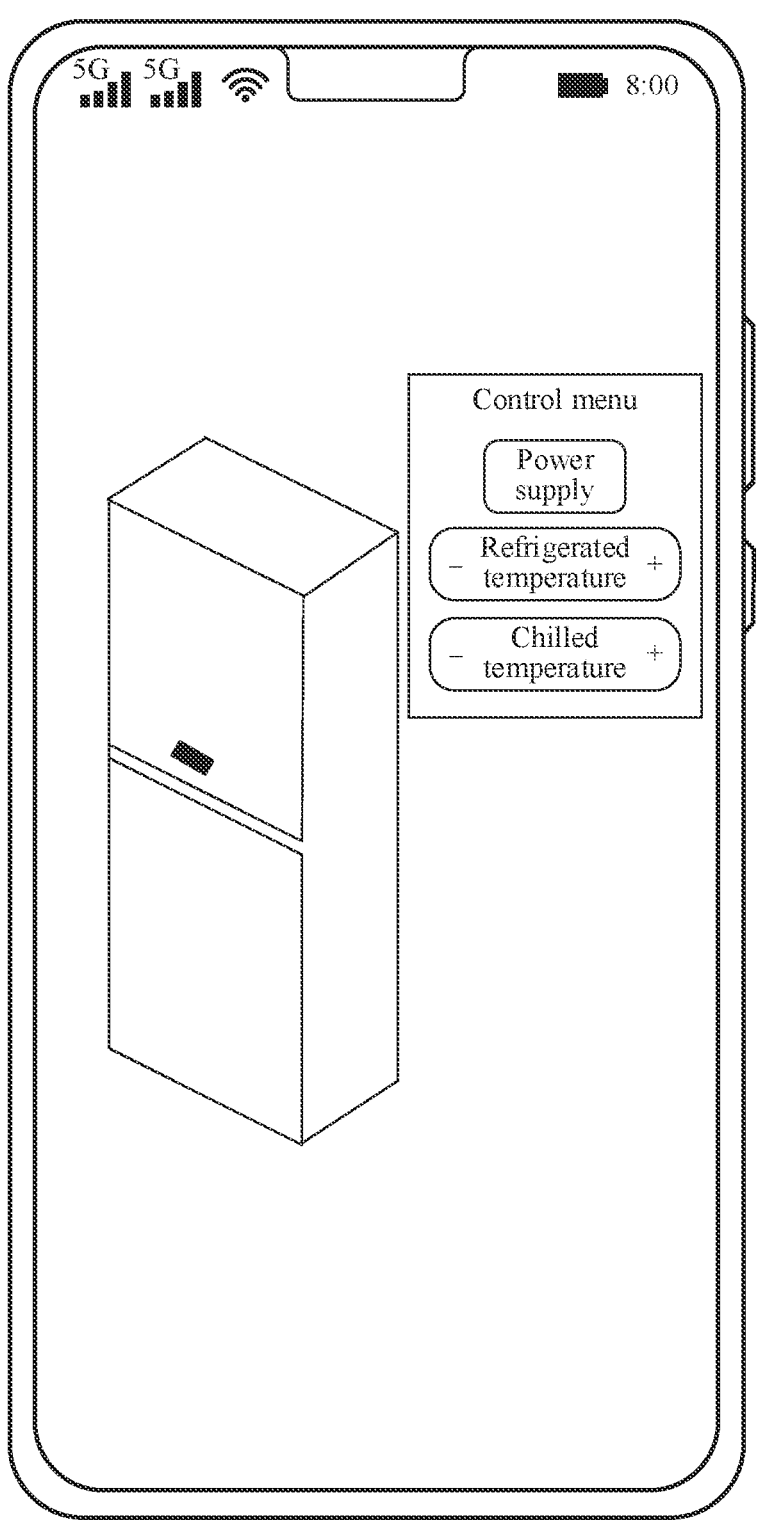
FIG. 4(*a*) to FIG. 4(*c*) and FIG. 5(*a*) to FIG. 5(*d*) each are
a schematic diagram of displaying a control menu according
to an embodiment of this application.
Figure 4B:
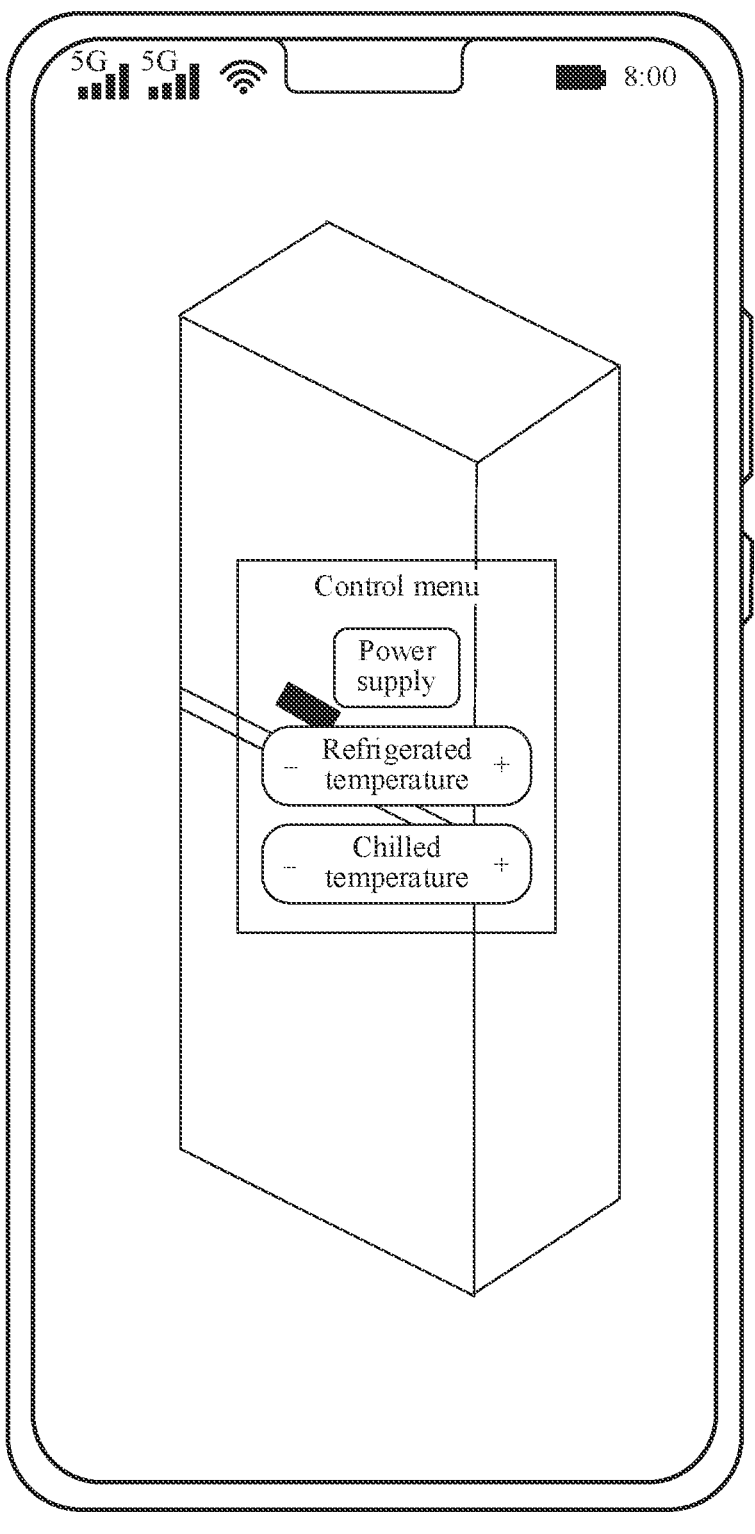

For example, the terminal device may display all menu items of the control menu as a whole in any location in the image by using the AR technology. For example, as shown in FIG. 4(a) the menu items are displayed near the target home device. Alternatively, as shown in FIG. 4(b), the menu items are displayed on the target home device. Specifically, when determining the target home device based on the image, the terminal device may further determine, based on the image, six degrees of freedom (6 Degrees of Freedom, 6DoF) pose information corresponding to the target home device, to display the control menu in the image based on the 6DoF pose information. Descriptions of how the terminal device determines, based on the image, the 6DoF pose information corresponding to the target home device is described in subsequent content.

Figure 4C:
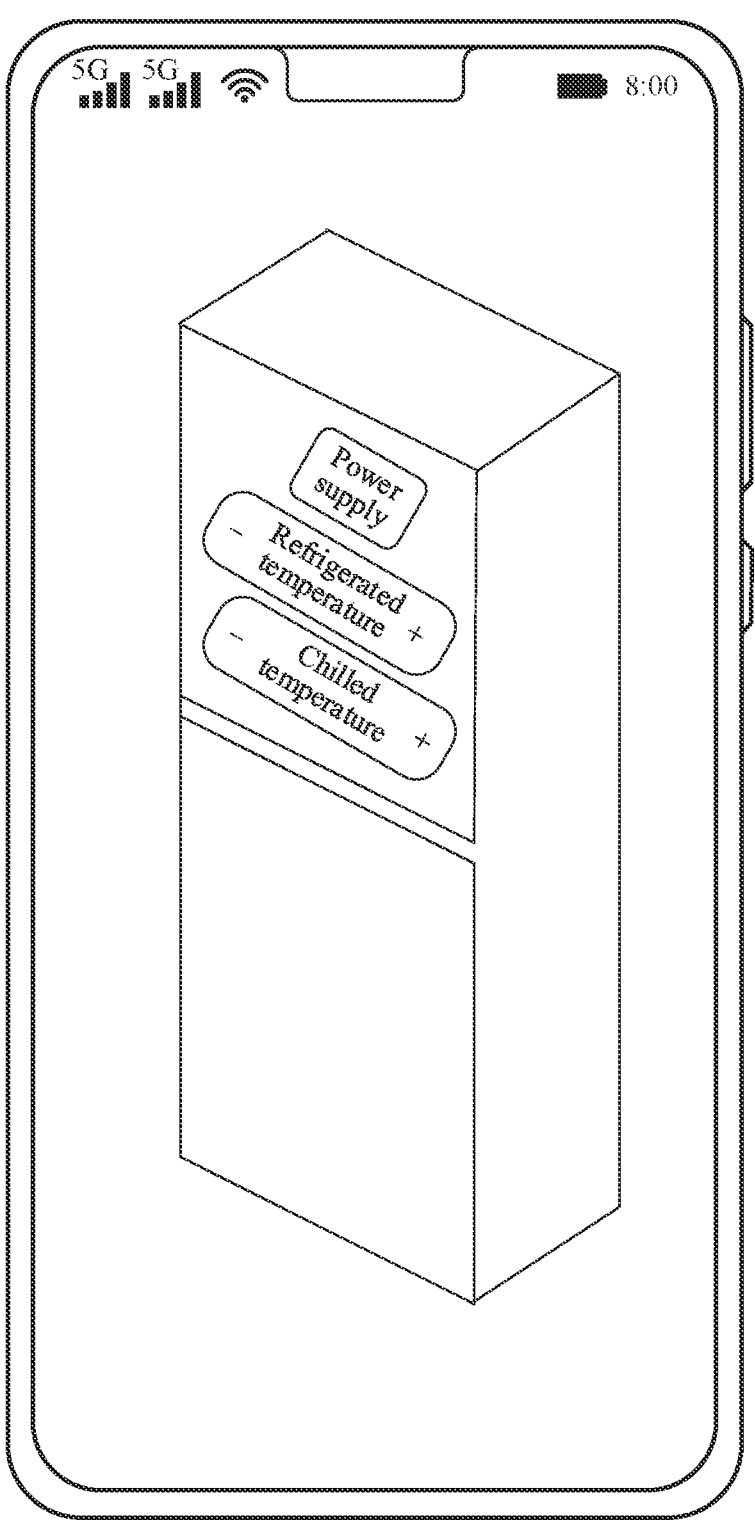

For example, the terminal device may separately display each menu item of the control menu at each target location in the image by using the AR technology. The target location corresponding to the menu item may be a location, in the image, of a menu item that is in a control menu carried by the target home device and that is the same as the menu item. For example, as shown in FIG. 4(c), each menu item of the control menu is displayed in the control menu carried by the target home device.

Specifically, the terminal device may perform image recognition and analysis on the obtained image, to determine the target location of each menu item of the target home device in the image. Then, the terminal device may display each menu item of the control menu at each target location. In other words, for a target home device that carries a control menu, the terminal device may integrate each menu item of the control menu corresponding to the target home device into the control menu carried by the target home device, so that the user can control the target home device in the image like directly controlling a home device of an entity, to improve interactive performance and improve user experience.

Figure 5A:
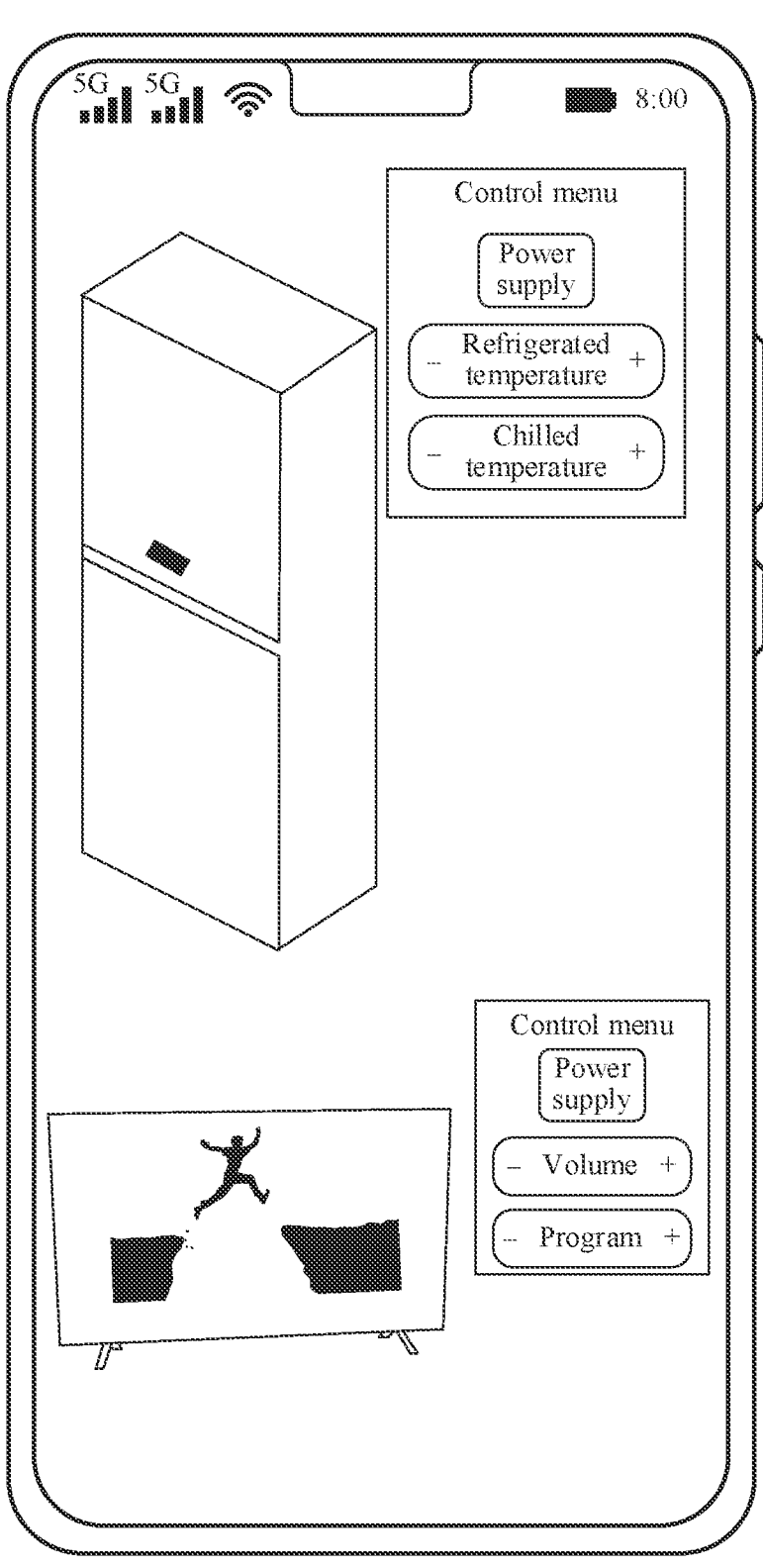
Figure 5B:
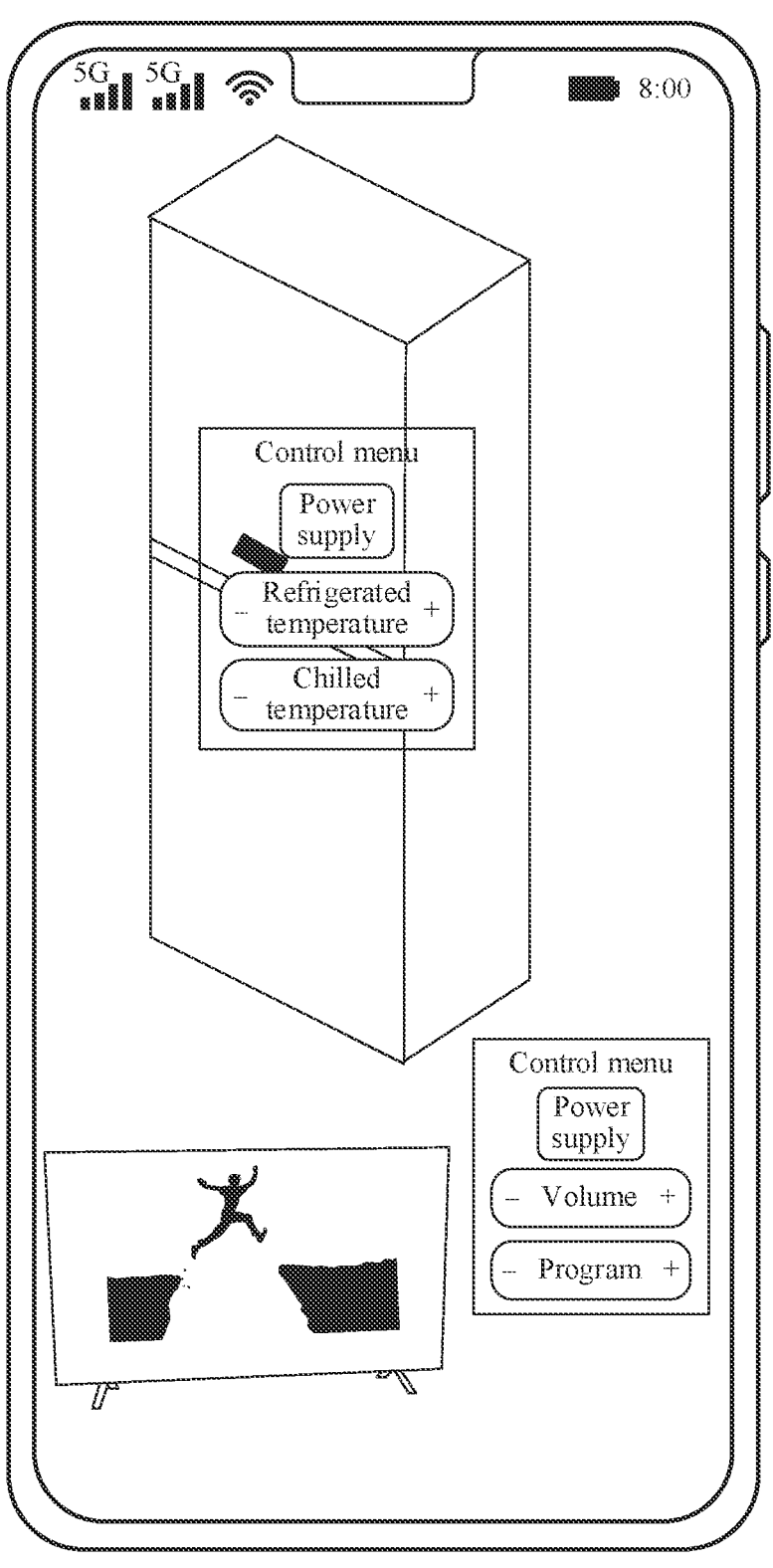
Figure 5C:
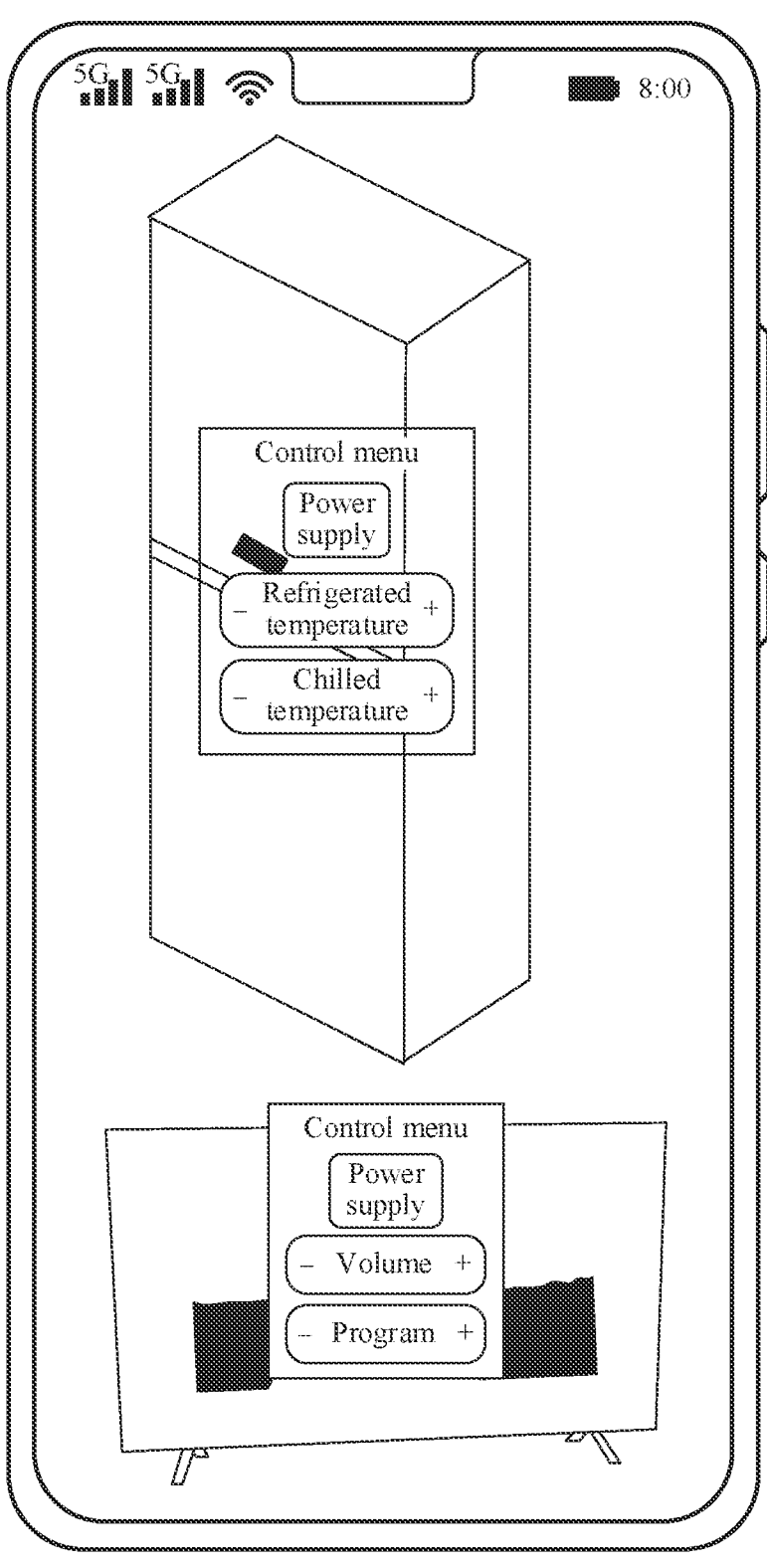
Figure 5D:
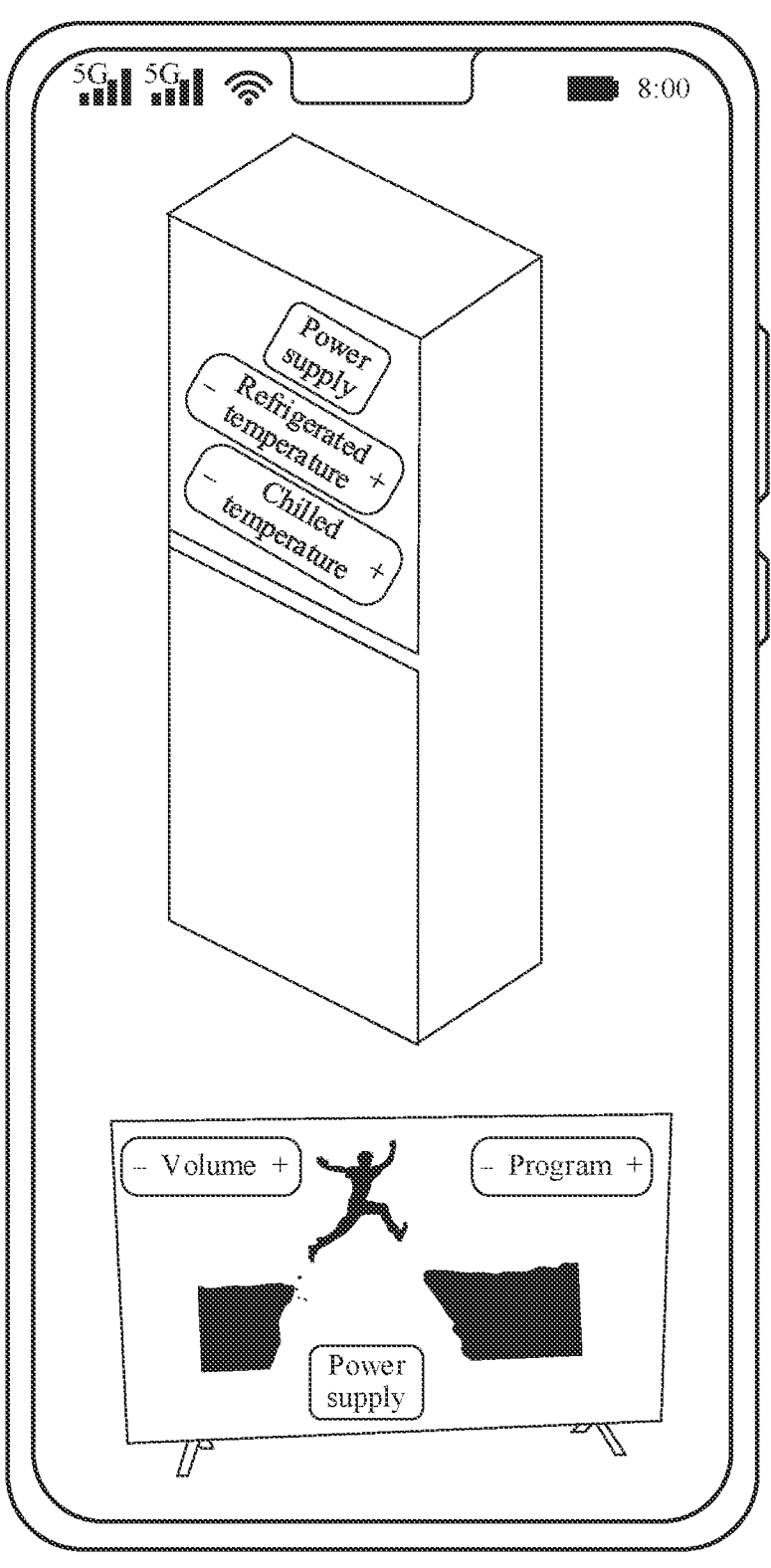

It should be understood that when the target area includes a plurality of target home devices, the terminal device may separately display, in the image by using the AR technology, a control menu corresponding to each target home device. For example, as shown in FIG. 5(a), the terminal device may display a control menu corresponding to the television near the television in the image, and display a control menu corresponding to the refrigerator near the refrigerator in the image. Alternatively, as shown in FIG. 5(b), the terminal device may display a control menu corresponding to the television near the television in the image, and display a control menu corresponding to the refrigerator on the refrigerator in the image. Alternatively, as shown in FIG. 5(c), the terminal device may display a control menu corresponding to the television on the television in the image, and display a control menu corresponding to the refrigerator on the refrigerator in the image. Alternatively, as shown in FIG. 5(d), the terminal device may integrate a control menu corresponding to the refrigerator into a control menu carried by the refrigerator in the image, and may integrate a control menu corresponding to the television into a control menu carried by the television in the image.

It should be noted that when the target area includes the plurality of target home devices, the control menu corresponding to each target home device may include device information such as a device name and/or a device number of each target home device, so that the user can accurately distinguish the control menu corresponding to each target home device.

S303: In response to a selection operation in the control menu, control the target home device to execute a target control instruction corresponding to the selection operation.

It should be understood that, after the terminal device displays the control menu corresponding to the target home device in the image, the user may perform an operation on the control menu displayed in the image, that is, may select a menu item in the control menu. After the terminal device detects a selection operation performed by the user on a menu item, the terminal device may control, in response to the selection operation, the target home device to perform a target control instruction corresponding to the selection operation.

In an example, the terminal device may be directly connected to the target home device. For example, the terminal device may establish a short-distance communication connection to the target home device. The short-distance communication connection may be a Bluetooth connection, a near field communication (Near Field Communication, NFC) connection, a wireless fidelity (Wireless Fidelity, Wi-Fi) connection, a ZigBee (ZigBee) connection, or the like. Herein, after the terminal device detects a selection operation performed by the user on a menu item in the control menu, the terminal device may directly send, to the target home device, a target control instruction corresponding to the menu item, to instruct the target home device to execute the target control instruction. The target control instruction may be an instruction for turning on the target home device, an instruction for turning off the target home device, an instruction for adjusting a volume of the target home device, or the like.

In another example, the terminal device and the target home device may be separately connected to the cloud. Therefore, after the terminal device detects a selection operation performed by the user on a menu item in the control menu, the terminal device may send, to the cloud, a target control instruction corresponding to the menu item. After receiving the target control instruction, the cloud may address a device control channel corresponding to the target home device, and send the target control instruction to the target home device through the device control channel, to instruct the target home device to execute the target control instruction.

Figure 6:
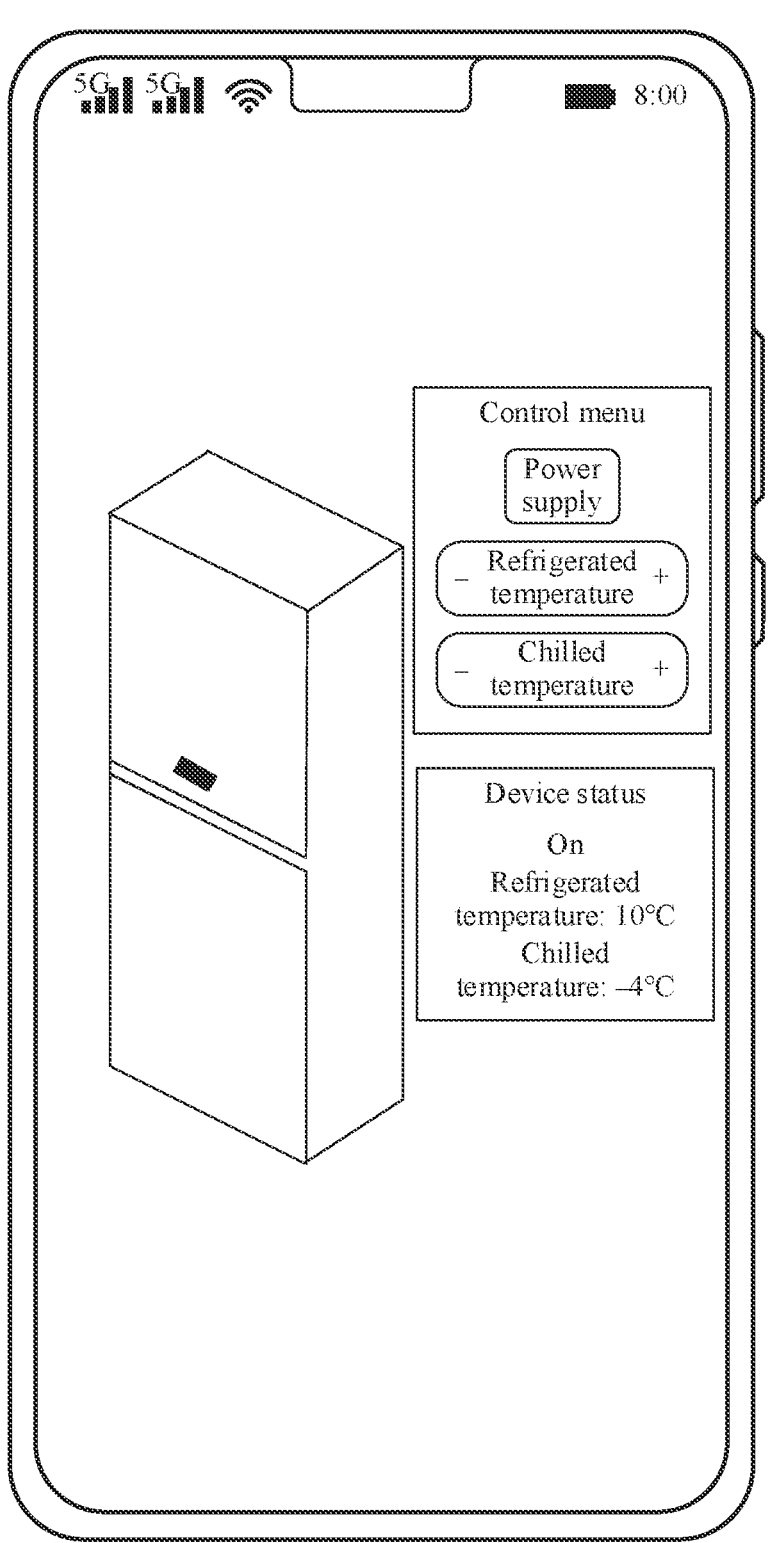
FIG. 6 is a schematic diagram of displaying a control
menu and a device status according to an embodiment of this
application.

In this embodiment, to improve control efficiency of the target home device, when obtaining the control menu corresponding to the target home device, the terminal device may further obtain a device status corresponding to the target home device. As shown in FIG. 6, the terminal device may display the device status in the image by using the AR technology, so that the user can correctly control the target home device based on the device status, to improve control efficiency of the target home device and improve user experience.

Herein, the terminal device may obtain, from a device shadow corresponding to the target home device, the device status corresponding to the target home device. The device shadow is a JSON document used to store the latest status of the device. The home device may obtain and set a device shadow in a use process, to synchronize a device status. That is, when the device status of the home device changes, the home device synchronizes the device status to the device shadow corresponding to the home device.

It should be understood that after the target home device executes the target control instruction, the target home device may directly report an execution result to the terminal device. The terminal device may update, based on the execution result, the device status corresponding to the target home device in the image. Alternatively, the target home device may report an execution result to the cloud, the cloud may send the execution result reported by the target home device to the terminal device, and the terminal device may update, based on the execution result, the device status corresponding to the target home device in the image.

The following describes in detail a process in which the terminal device determines the target home device based on the image.

In an example, the terminal device may determine the to-be-controlled target home device based on a device feature in the image. Specifically, the terminal device may first perform device detection on the image, to detect a home device in the image. Then, feature extraction may be performed on the home device in the image, to extract a device feature of the home device, and the extracted device feature may be matched against a preset device feature in a device feature library, to obtain a first matching result, so that the to-be-controlled target home device may be determined based on the first matching result, and the 6DoF pose information corresponding to the target home device may be determined based on the first matching result. For example, preset 6DoF pose information of the image corresponding to the first matching result may be determined as the 6DoF pose information corresponding to the target home device. Alternatively, 6DoF pose information corresponding to the image may be calculated based on the image corresponding to the first matching result, and the 6DoF pose information obtained through calculation may be determined as the 6DoF pose information corresponding to the target home device. It should be understood that the preset device feature also refers to a device feature corresponding to each home device, and refers to a device feature extracted and stored when a device feature library is established. A manner of calculating the 6DoF pose information based on the image is not limited in this embodiment, and may be an existing calculation manner.

The device feature may be a speeded-up robust feature (Speeded-Up Robust Feature, SURF), or may be a scale-invariant feature transform (Scale-invariant feature transform, SIFT), or may be an oriented FAST and rotated BRIEF (Oriented FAST and Rotated BRIEF, ORB). Herein, the device feature may include a feature point and a feature descriptor (Feature Descriptor). The feature point is used to represent a location of the device feature on the image, and the feature descriptor is used to represent a local feature (generally expressed in a form of a vector) of the location on the image. This embodiment does not specifically limit an extraction algorithm of the device feature, and an existing extraction algorithm may be used to extract the device feature.

It should be noted that the device feature library may be a pre-established feature library, and the device feature library may include preset device features corresponding to a plurality of home devices. A corresponding index may be established between each preset device feature in the device feature library and a corresponding home device, so that the target home device may be determined by using the index, to improve efficiency of determining the target home device.

For example, the terminal device may establish the device feature library based on each home device of the entity. Specifically, for each home device, the terminal device may first obtain a device identifier such as a device name and/or a device number corresponding to the home device, and may start the camera of the terminal device to perform 360-degree image scanning on the home device, that is, obtain device images corresponding to the home device from different angles. Then, the terminal device may separately extract, from each obtained device image, each preset device feature corresponding to the home device, that is, separately extract the preset device feature corresponding to each device image, separately store the preset device feature corresponding to each device image as a whole into the device feature library, and establish an index between the home device and a preset device feature as a whole, that is, establish an index between the device identifier such as the device name and/or the device number corresponding to the home device and the preset device feature as a whole corresponding to each device image.

For example, when a device image A, a device image B, and a device image C corresponding to the home device are obtained from different angles, each preset device feature corresponding to the device image A may be extracted, and each preset device feature corresponding to the device image A may be stored in the device feature library as a whole (for example, a preset device feature A as a whole), and an index between the home device and the preset device feature A is established. Similarly, each preset device feature corresponding to the device image B may be extracted, and each preset device feature corresponding to the device image B may be stored as a whole (for example, a preset device feature B as a whole) to the device feature library, and an index between the home device and the preset device feature B is established. Similarly, a preset device feature C corresponding to the device image C may be extracted, and each preset device feature corresponding to the device image B may be stored as a whole (for example, a preset device feature C as a whole) to the device feature library, and an index between the home device and the preset device feature C is established.

Herein, the device feature library is established by performing 360-degree feature extraction on the home device, so that 360-degree field-of-view matching can be performed during device feature matching, to improve device feature matching precision and accuracy of determining the target home device.

For example, the terminal device may establish the device feature library based on a three-dimensional 3D model of the home device. For each home device, when producing the home device, a home appliance manufacturer may model the home device by using a 3D modeling tool (such as Autodesk), to obtain the 3D model of the home device, and then upload the 3D model and a device identifier corresponding to the 3D model to the cloud. Alternatively, a home appliance manufacturer may directly obtain the device image corresponding to the home device, and upload the device image and the device identifier corresponding to the home device to the cloud. The cloud may establish the 3D model of the home device based on the device image. The 3D model obtained through modeling needs to have real texture information.

When the terminal device establishes the device feature library, for each home device, the terminal device may first obtain the device identifier corresponding to the home device, and may obtain the 3D model of the home device from the cloud based on the device identifier. Then, the terminal device may obtain, from different angles, model images corresponding to the 3D model. Then, the terminal device may separately extract, from each obtained model image, each preset device feature corresponding to the home device, that is, separately extract the preset device feature corresponding to each model image, and may separately store the preset device feature corresponding to the model image as a whole into the device feature library, and establish an index between the home device and the preset device feature as a whole, that is, establish an index between the device identifier of the home device and the preset device feature as a whole corresponding to the model image.

A process of obtaining each model image corresponding to the home device may be specifically as follows: The terminal device may first generate a key point of the model based on the 3D model, and the key point of the model is used as a reference point for rotation and flipping of the model. Then, the terminal device may perform upper hemisphere sampling based on the key point to determine an initial pose of the 3D model, to perform off-screen rendering on the 3D model. Then, the terminal device may perform left-right rotation and up-down flipping of the model, and may obtain the model image at intervals of a preset angle in a process of left-right rotation and up-down flipping, to obtain model images of the 3D model from a plurality of angles. Herein, left-right rotation needs to cover all 360 degrees, up-down flipping may be performed by selecting a most important 180 degrees, and a preset angle may be specifically determined based on a model complexity. For example, in a specific application scenario, the preset angle may be determined as 10 degrees.

In this embodiment, to improve effectiveness of obtaining the model image, before obtaining each model image corresponding to the home device, the terminal device may first preprocess the 3D model. Preprocessing may be deleting redundant vertices of the 3D model, adjusting an orientation and a size of the 3D model, or the like.

It should be noted that a process of establishing the device feature library may alternatively be performed by the cloud, that is, the cloud may establish the device feature library in advance based on the home device of the entity or the 3D model of the home device. Therefore, when determining the target home device, the terminal device may first obtain the device feature library from the cloud, and then determine the to-be-controlled target home device based on the preset device feature in the device feature library and the device feature extracted by the terminal device from the image.

A process in which the cloud establishes the device feature library based on the home device of the entity or the 3D model of the home device is similar to a process in which the terminal device establishes the device feature library based on the home device of the entity or the 3D model of the home device. Basic principles of the two processes are the same. For brevity, details are not described herein again.

It should be understood that the terminal device may extract a plurality of device features from the image, and the device feature library may also include a plurality of preset device features corresponding to each device image or each model image. In this embodiment, the terminal device may use an existing method such as a violent matching method or a nearest neighbor matching method to match the device feature corresponding to the image against the preset device feature corresponding to the device image or the model image, respectively, to obtain the first matching result. That is, matching between the device feature and the preset device feature is performed to find a target device image or a target model image that matches the image. The target device image or the target model image may be characterized by using a preset device feature corresponding to the target device image or the target model image. In other words, the first matching result may be the preset device feature corresponding to the target device image or the target model image that matches the image. Then, the terminal device may determine the to-be-controlled target home device based on an index between the first matching result and the home device, that is, may determine the device identifier corresponding to the to-be-controlled target home device.

In this embodiment, the terminal device may determine the first matching result based on a quantity of device features that can match the preset device feature and a total quantity of device features. Specifically, for each device image or model image, the terminal device may first match each device feature against a preset device feature corresponding to the device image or the model image, and determine a quantity of device features that can match a corresponding preset device feature. When a ratio of the quantity to the total quantity of device features is greater than or equal to a first preset threshold, the terminal device may determine the preset device feature corresponding to the device image or the model image as the first matching result. The ratio of the quantity to the total quantity of device features may be the quantity/the total quantity, and the first preset threshold may be determined based on a specific situation. This is not limited in this embodiment.

For example, in a scenario in which the first preset threshold is 70%, when there are 1000 device features corresponding to the image, 750 device features in the 1000 device features may match a corresponding preset device feature in the preset device feature corresponding to the device image A, and 600 device features may match a corresponding preset device feature in the preset device feature corresponding to the device image B, and 500 device features may match a corresponding preset device feature in the preset device feature corresponding to the device image C, the terminal device may determine that the device feature matches the preset device feature corresponding to the device image A, that is, may determine that the preset device feature corresponding to the device image A is the first matching result. In this case, the terminal device may determine a home device (for example, the refrigerator) indexed by the preset device feature corresponding to the device image A as the to-be-controlled target home device.

In this embodiment, the terminal device may further determine the first matching result based on a quantity of device features that meet a homography matrix. The homography refers to a mapping relationship from one plane to another plane, and the homography matrix is a transformation equation from a point on one plane to another plane. Specifically, for each device image or model image, the terminal device may first match each device feature against a preset device feature corresponding to the device image or the model image, to obtain the preset device feature corresponding to the device feature. Then, the terminal device may determine whether the device feature and the preset device feature corresponding to the device feature belong to a homography matrix, to obtain a quantity of device features that meet the homography matrix in the device features. When the quantity is greater than or equal to a second preset threshold, the terminal device may determine the preset device feature corresponding to the device image or the model image as the first matching result. The second preset threshold may be determined based on a specific situation. This is not limited in this embodiment.

In another example, the terminal device may alternatively determine the to-be-controlled target home device based on a trained neural network model. Specifically, the terminal device may input the obtained image into the trained neural network model for processing, to obtain a device identifier output by the neural network model, and may determine the target home device based on the device identifier. The neural network model may be a neural network model established based on a tensor flow (TensorFlow).

In this embodiment, the terminal device may train the neural network model based on each home device of the entity. Specifically, for each home device, the terminal device may enable the camera of the terminal device to perform 360-degree image scanning on the home device, that is, may obtain, from different angles, device images corresponding to the home device, and may obtain a device identifier corresponding to the home device, for example, may input the device identifier by the user. Then, the terminal device may input each device image and the device identifier of the home device corresponding to each device image into an initial neural network model for training, to obtain the trained neural network model. Herein, 360-degree images of each home device are obtained, and the neural network model is trained by using the obtained device images, so that the neural network model obtained through training can perform 360-degree field-of-view matching, to improve accuracy of determining the target home device.

It should be understood that, to improve recognition accuracy of the neural network model, based on obtaining the device image, the terminal device may further obtain another training image that includes the home device or does not include the home device, and may combine the device image and the training image into a training picture set, to train the neural network model by using the training picture set.

Figure 7:
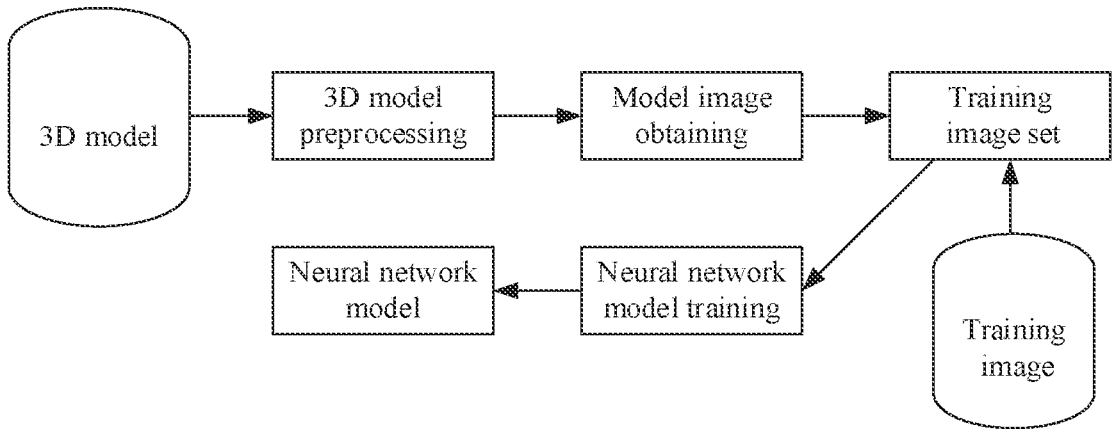
FIG. 7 is a schematic diagram of training a neural network
model according to an embodiment of this application.

In this embodiment, the terminal device may also train the neural network model based on the three-dimensional 3D model of the home device. As shown in FIG. 7, the terminal device may first obtain the 3D model of the home device and a device identifier corresponding to the 3D model. Then, the terminal device may obtain each model image corresponding to each 3D model from different angles, and may input the model image and a device identifier of the 3D model corresponding to the model image into the initial neural network model for training, to obtain the trained neural network model.

To improve effectiveness of obtaining the model image and improve training efficiency of the neural network model, before obtaining the model image corresponding to the 3D model, the terminal device may first preprocess the 3D model. Preprocessing may be deleting redundant vertices of the 3D model, adjusting an orientation and a size of the 3D model, or the like. In addition, to improve recognition accuracy of the neural network model, based on obtaining the model image, the terminal device may further obtain another training image that includes the home device or does not include the home device, and may combine the model image and the training image into a training image set, to train the neural network model by using the training image set.

For a process of obtaining the model image herein, refer to the foregoing process of obtaining the model image. Details are not described herein again.

It should be noted that the neural network model may alternatively be obtained through training by the cloud. That is, the cloud may obtain, from different angles in advance, device images corresponding to each home device or model images corresponding to a 3D model of each home device, and may combine the obtained device images or model images and a training image obtained in advance in the cloud into a training image set, and then train the initial neural network model by using the training image set, to obtain the trained neural network model. Therefore, when determining the target home device, the terminal device may first obtain the trained neural network model from the cloud, and may input the obtained image into the trained neural network model for processing, to obtain a device identifier output by the neural network model, so as to determine the to-be-controlled target home device based on the device identifier.

It should be understood that, when the user has two or more same home devices, the terminal device may determine the target home device with reference to an environment feature of an environment in which each home device is located.

For example, the terminal device may perform device detection on the image, and obtain a device feature of a detected home device and an environment feature of an environment in which the home device is located. Then, the device feature may be matched against a preset device feature in the device feature library to obtain a first matching result, and the environment feature may be matched against a preset environment feature in an environment feature library to obtain a second matching result, so that the to-be-controlled target home device may be determined based on the first matching result and the second matching result.

For example, when inputting the image into the trained neural network model for processing to obtain the device identifier, the terminal device may further perform device detection on the image, and obtain an environment feature of an environment in which a detected home device is located. Then, the environment feature may be matched against the preset environment feature in the environment feature library to obtain a third matching result, so that the to-be-controlled target home device may be determined based on the device identifier and the third matching result. The third matching result may include location information of the detected home device.

It should be noted that the environment feature library may be a pre-established feature library. The environment feature library may include a preset environment feature of the environment in which each home device is located. A corresponding index may be established between each preset environment feature in the environment feature library and a corresponding home device, that is, a corresponding index may be established between each preset environment feature in the environment feature library and location information corresponding to the corresponding home device. It should be understood that the preset environment feature also refers to an environment feature corresponding to an environment in which each home device is located, and refers to an environment feature extracted and stored when the environment feature library is established.

Figure 8A:
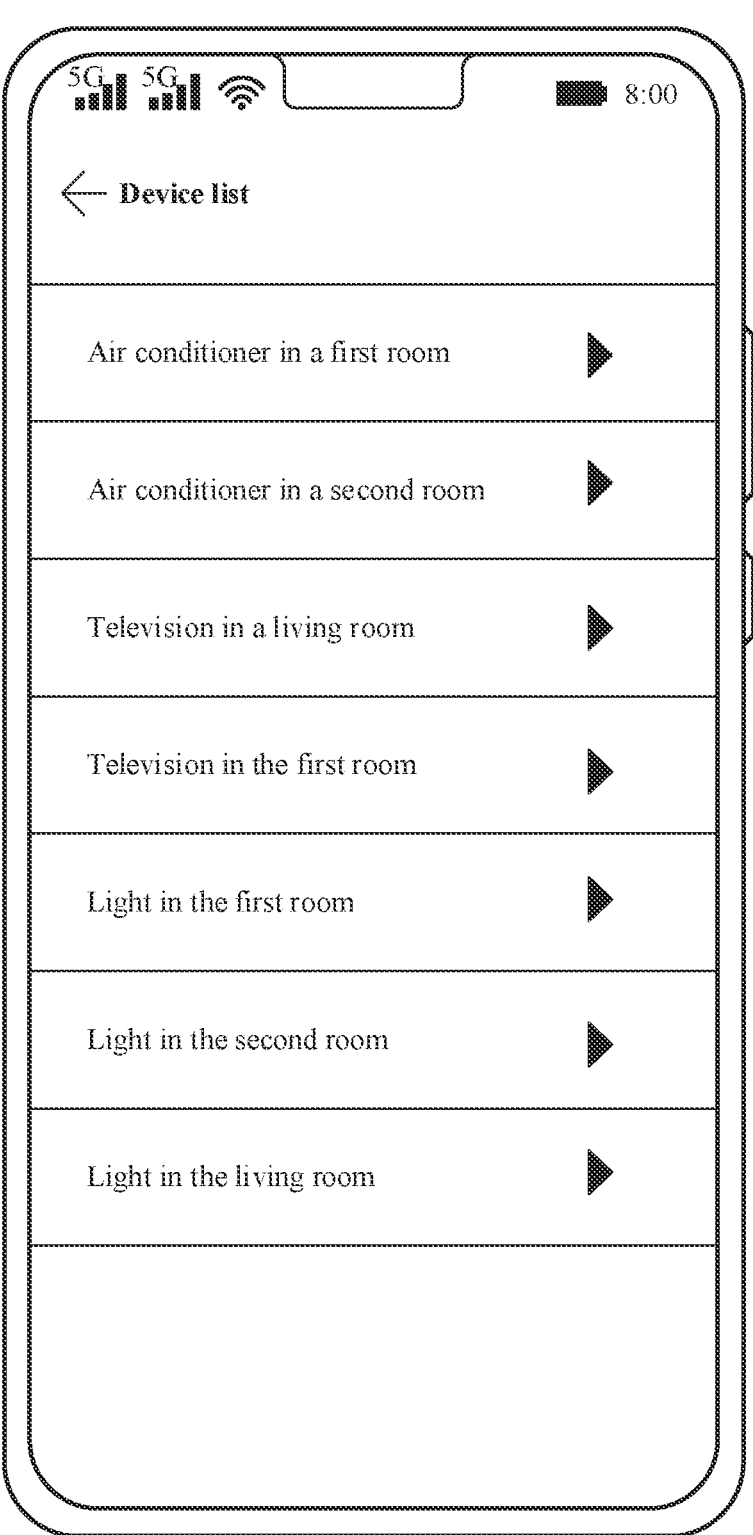
FIG. 8(*a*) to FIG. 8(*c*) are an example diagram of obtain-
ing an environment image according to an embodiment of
this application.
Figure 8B:
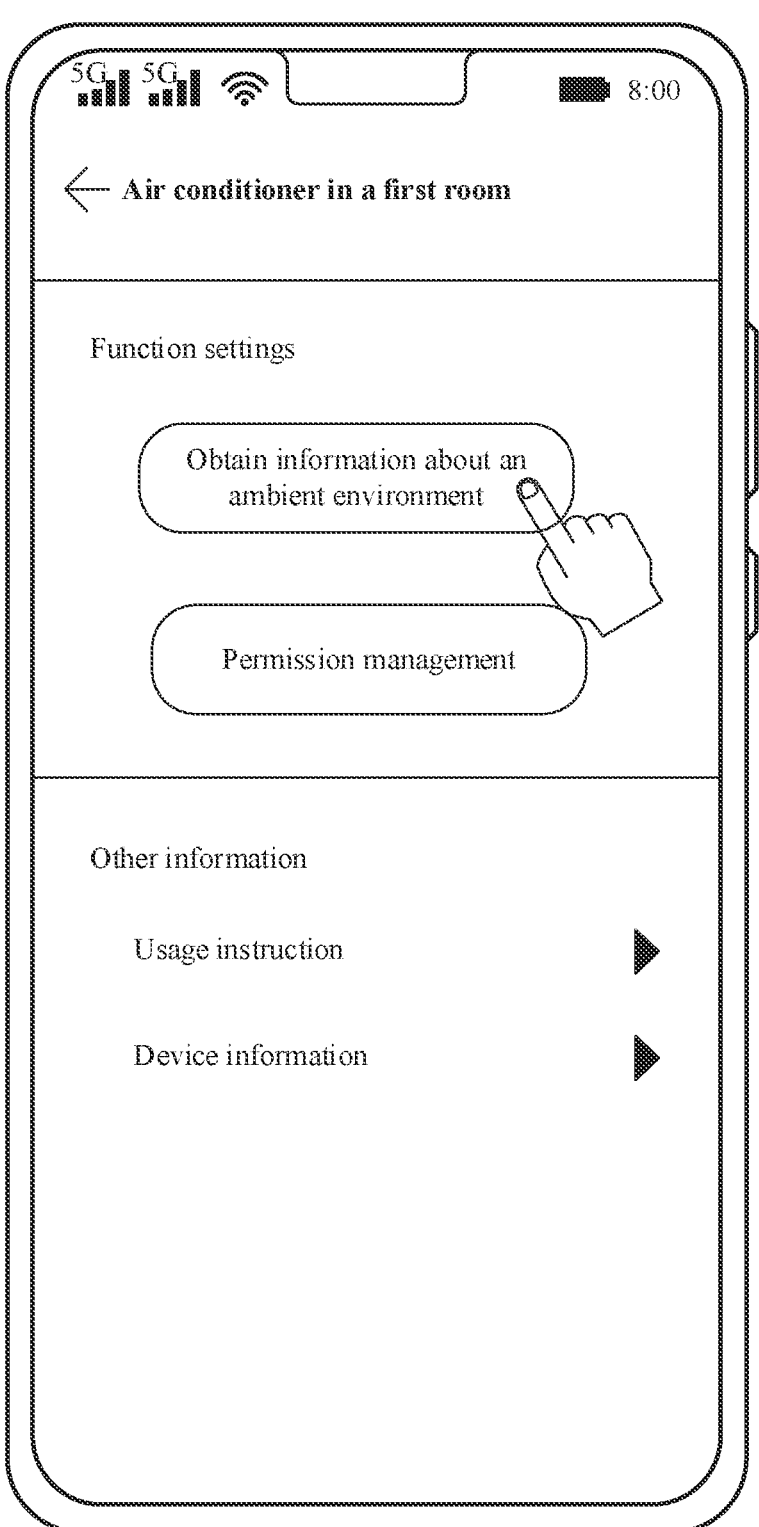

In this embodiment, an application for intelligent control on a home device is installed in the terminal device, and the terminal device may manage, by using the application, a home device on which the intelligent control can be performed. Therefore, when the environment feature library needs to be established, the user may open the application, and enter a device list page shown in FIG. 8(a). The device list page may display each home device on which the intelligent control can be performed. The user may tap any home device on the device list page, and the terminal device may jump to a device details page corresponding to the home device. As shown in FIG. 8(b), a button of "obtaining ambient environment information" may be displayed on the device details page. After the user taps the button, the terminal device may enable the camera of the terminal device in response to the tap operation on the button, and may collect an environment image (or environment video) of an environment in which the home device is located by using the camera. Then, the terminal device may perform feature detection and extraction on the collected environment image (or environment video), to obtain a preset environment feature of the environment in which the home device is located, and may store the preset environment feature of the environment in which the home device is located in the environment feature library, and establish an index between the home device and the preset environment feature, that is, establish an index between location information corresponding to the home device and the preset device feature.

Figure 8C:
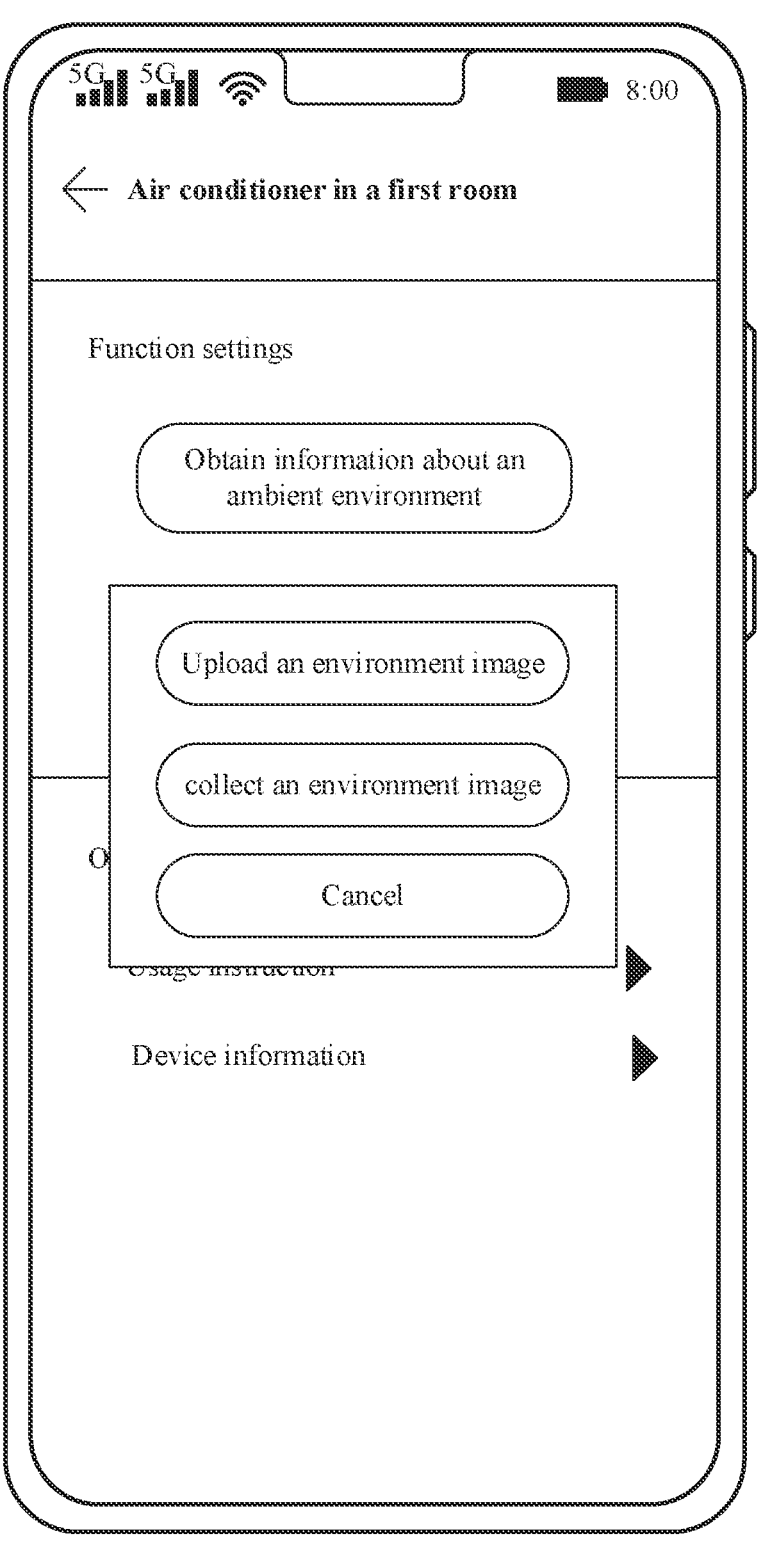

In this embodiment, the terminal device may alternatively perform feature detection and extraction on an environment image (or environment video) uploaded by the user, to obtain the preset environment feature of the environment in which the home device is located. That is, after the user taps the button of "obtaining ambient environment information", the terminal device may pop up, in response to the tapping operation on the button, a pop-up window shown in FIG. 8(c). The pop-up window displays selection keys of "uploading an environment image", "collecting an environment image", and "canceling". When a selection key of "uploading an environment image" is triggered, the terminal device may enter a page for uploading an image, to obtain an environment image (or environment video) uploaded by the user, and may perform feature detection and extraction on the obtained environment image (or environment video), to obtain the preset environment feature of the environment in which the home device is located. When a selection key of "collecting an environment image" is triggered, the terminal device may enable the camera of the terminal device to obtain an environment image (or environment video), and may perform feature detection and extraction on the obtained environment image (or environment video), to obtain the preset environment feature of the environment in which the home device is located.

Similar to the device feature, the environment feature may also be a speeded-up robust feature (Speeded-Up Robust Feature, SURF), or may be a scale-invariant feature transform (Scale-invariant feature transform, SIFT), or may be an oriented FAST and rotated BRIEF (Oriented FAST and Rotated BRIEF, ORB). Herein, the environment feature may also include a feature point and a feature descriptor.

In this embodiment, when a home device needs to be controlled, the terminal device may obtain an image corresponding to a target area, and may determine, based on the image, the target home device that needs to be controlled. Then, a control menu corresponding to the target home device may be obtained, and the control menu is displayed in the image by using an AR technology, that is, both the target home device and the control menu corresponding to the target home device are displayed in the image, so that the user can directly trigger a corresponding menu item in the control menu to control the target home device. This can simplify a home device control procedure, and improve home device control efficiency. In addition, the user controls the target home device by directly performing an operation on the control menu in the image in which the target home device and the control menu are displayed, which is the same as that the user directly controls the home device in an actual scenario. This implements an objective that what the user sees is what the user controls, greatly improves interactive performance in home device control, improves user experience, and has strong usability and practicability.

Embodiment 2

Figure 9:
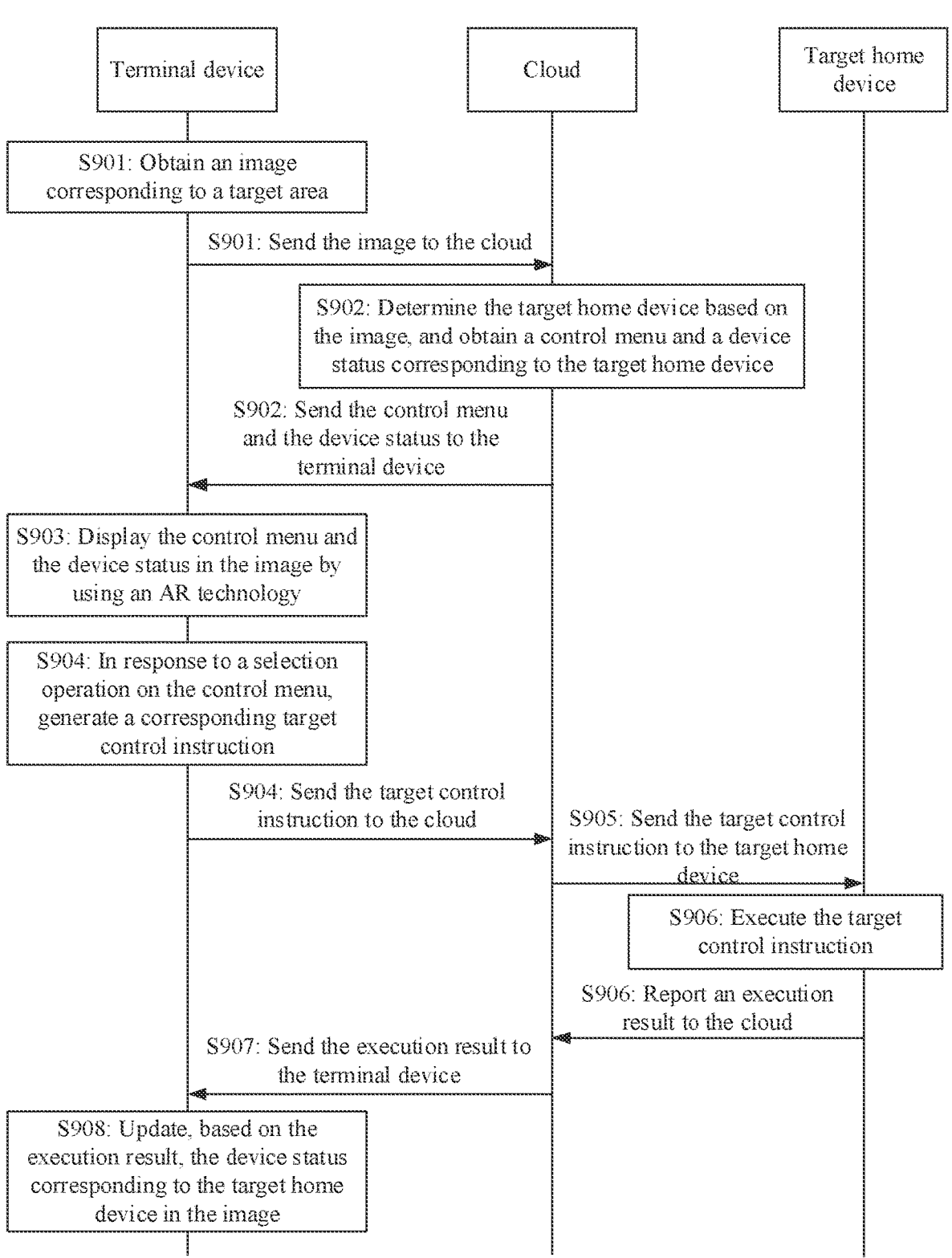
FIG. 9 is a schematic flowchart of a home device control
method according to an embodiment 2 of this application.

FIG. 9 is a schematic flowchart of a home device control method according to an embodiment 2 of this application. As shown in FIG. 9, the method in this embodiment may include the following steps.

S901: A terminal device obtains an image corresponding to a target area, and sends the image to a cloud.

S902: The cloud determines a target home device based on the image, obtains a control menu and a device status that are corresponding to the target home device, and sends the control menu and the device status to the terminal device.

A manner in which the terminal device obtains the image corresponding to the target area is the same as that in S301 in the embodiment 1, in which the terminal device obtains the image corresponding to the target area. Details are not described herein again.

In this embodiment, after obtaining the image corresponding to the target area, the terminal device may send the image to the cloud. The cloud may determine the to-be-controlled target home device based on the image.

In an example, the cloud may determine the to-be-controlled target home device based on a device feature in the image. Specifically, the cloud may first perform device detection on the image to detect a home device in the image. Then, feature extraction may be performed on the home device in the image, to extract a device feature of the home device, and the extracted device feature may be matched against a preset device feature in a device feature library, to obtain a first matching result, so that the to-be-controlled target home device may be determined based on the first matching result.

In another example, the cloud may alternatively determine the to-be-controlled target home device based on a trained neural network model. Specifically, the cloud may input the image into the trained neural network model for processing, to obtain a device identifier output by the neural network model, and may determine the target home device based on the device identifier.

In this embodiment, the device feature library may be established by the cloud based on each home device or a three-dimensional 3D model corresponding to the home device. A process of establishing the device feature library by the cloud is similar to the process of establishing the device feature library by the terminal device in the embodiment 1, and basic principles of the two processes are the same. Details are not described herein again. Similarly, the trained neural network model may also be obtained through training by the cloud based on a device image corresponding to each home device or a model image corresponding to a 3D model of each home device. A process of training the neural network model by the cloud is similar to the process of training the neural network model by the terminal device in the embodiment 1, and basic principles of the two processes are the same. Details are not described herein again.

Herein, after determining the to-be-controlled target home device based on the image, the cloud may obtain the control menu corresponding to the target home device. For example, the cloud may obtain, from a preset storage apparatus, the control menu corresponding to the target home device. For example, the cloud may obtain the control menu corresponding to the target home device by performing image analysis on the obtained image. For example, the cloud may obtain a device profile corresponding to the target home device, and may generate, based on the device profile, the control menu corresponding to the target home device. Alternatively, after obtaining a device profile, the cloud may directly send the device profile to the terminal device, to indicate the terminal device to generate, based on the device profile, the control menu corresponding to the target home device. In other words, the control menu sent by the cloud to the terminal device may also be a device profile corresponding to the control menu.

It should be understood that after determining the target home device, the cloud may further obtain, from a device shadow corresponding to the target home device based on the device identifier of the target home device, the device status corresponding to the target home device. A device shadow corresponding to each home device may be stored in the cloud.

S903: The terminal device receives the control menu and the device status that are sent by the cloud, and displays the control menu and the device status in the image by using the AR technology.

For specific content that the terminal device displays the control menu and the device status m the image by using the AR technology, refer to the description in S302 in the embodiment 1. Details are not described herein again.

S904: The terminal device generates, in response to a selection operation on the control menu, a target control instruction corresponding to the selection operation, and sends the target control instruction to the cloud.

In this embodiment, after the terminal device displays, in the image by using the AR technology, the control menu and the device status that are corresponding to the target home device, the user may directly perform an operation on the control menu in the image to control the target home device. That is, the user may directly select any menu item (for example, an enabling item) in the control menu. After detecting that the enabling item in the control menu is triggered, the terminal device may generate a target control instruction corresponding to the enabling item, and send the target control instruction to the cloud.

S905: The cloud receives the target control instruction sent by the terminal device, and sends the target control instruction to the target home device.

After receiving the target control instruction sent by the terminal device, the cloud may forward the target control instruction to the target home device. It should be understood that, to ensure effectiveness of home device control, the cloud may have a permission verification process. That is, after receiving the target control instruction sent by the terminal device, the cloud may first perform permission verification on the terminal device, to determine whether the terminal device has permission to control the target home device. When the permission verification succeeds, the cloud may obtain a device control channel corresponding to the target home device, and may send the target control instruction to the target home device through the device control channel. When the permission verification fails, the cloud may determine that the terminal device does not have permission to control the target home device. That is, the cloud may refuse to send the target control instruction, to reject control of the terminal device on the target home device.

S906: The target home device receives the target control instruction sent by the cloud, executes the target control instruction, and reports an execution result to the cloud.

S907: The cloud receives the execution result reported by the target home device, and sends the execution result to the terminal device.

S908: The terminal device updates, based on the execution result, the device status corresponding to the target home device in the image.

It should be understood that, after the target home device receives the target control instruction, the target home device may execute the target control instruction, to turn on the target home device, turn off the target home device, adjust a temperature of the target home device, or the like. After executing the target control instruction, the target home device may feed back the execution result to the cloud. The cloud may send, to the terminal device, the execution result fed back by the target home device. After receiving the execution result of the target home device, the terminal device may update, based on the execution result, the device status corresponding to the target home device in the image, for example, update the device status corresponding to the target home device from an off state to an on state, or update the device status corresponding to the target home device from an on state to an off state, or update a temperature in the device status corresponding to the target home device from 23 degrees to 26 degrees.

In this embodiment, when a home device needs to be controlled, the terminal device may obtain an image corresponding to a target area, and send the image to the cloud. The target home device that needs to be controlled is determined by using the cloud, and a control menu corresponding to the target home device is obtained and sent to the terminal device. The terminal device may display the control menu in the image by using the AR technology, so that the user can directly trigger a corresponding menu item in the control menu to control the target home device. This can simplify a home device control procedure, and improve home device control efficiency. In addition, the user controls the target home device by directly performing an operation on the control menu in the image in which the target home device and the control menu are displayed, which is the same as that the user directly controls the home device in an actual scenario. This implements an objective that what the user sees is what the user controls, greatly improves interactive performance in home device control, improves user experience, and has strong usability and practicability. In addition, determining the target home device by using the cloud can reduce processing performance of the terminal device, improve efficiency of determining the target home device, and further improve home device control efficiency.

Figure 10:
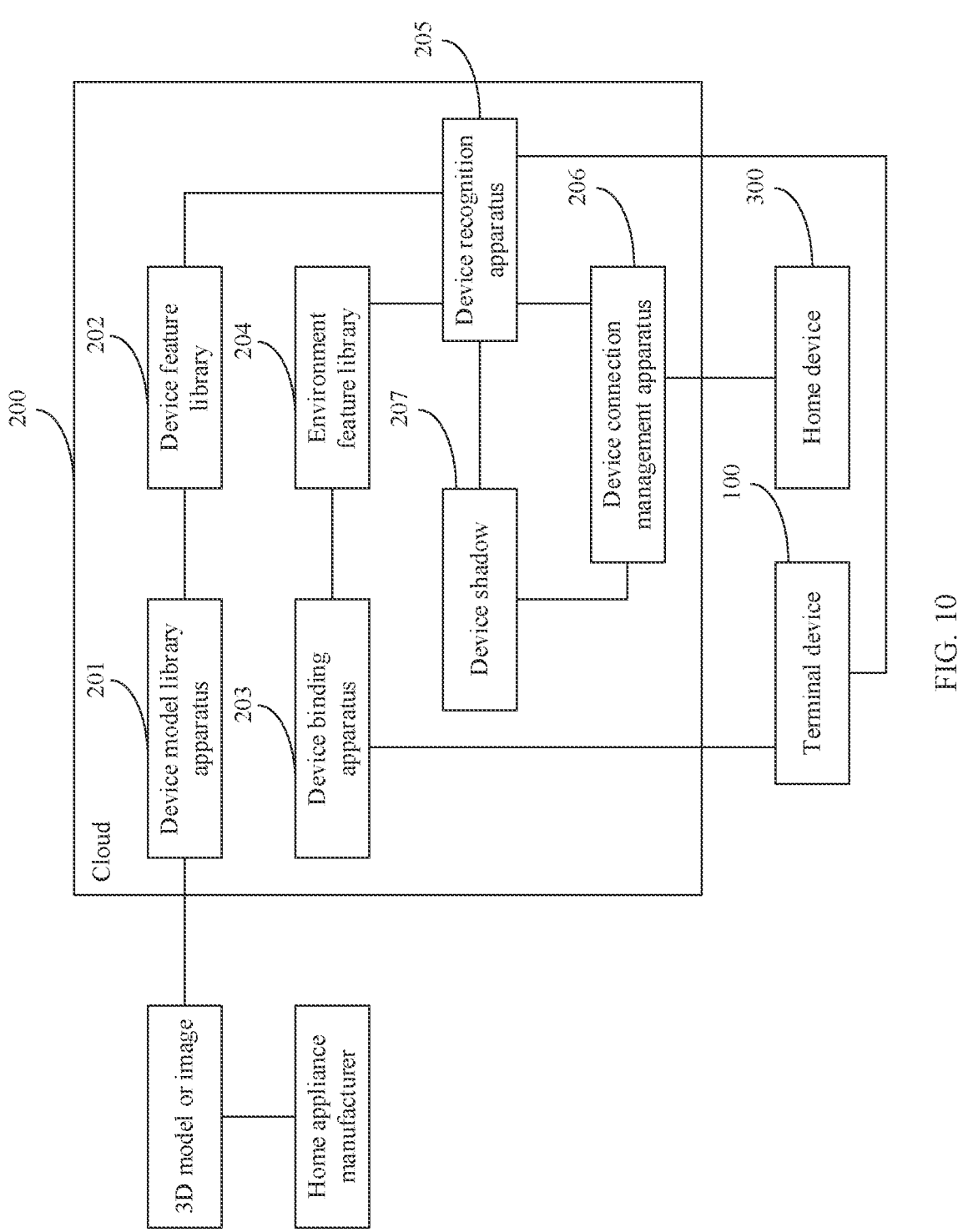
FIG. 10 is a diagram of a system structure of a control
system to which a home device control method is applicable
according to an embodiment 2 of this application.

FIG. 10 is a diagram of a system structure of a control system to which a home device control method is applicable according to the embodiment 2. As shown in FIG. 10, the system may include the terminal device 100, a cloud 200, and a home device 300. The cloud 200 may include a device model library apparatus 201, a device feature library 202, a device binding apparatus 203, an environment feature library 204, a device recognition apparatus 205, a device connection management apparatus 206, and a device shadow 207.

The device model library apparatus 201 is configured to receive a 3D model of a home device uploaded by a home appliance manufacturer, or configured to receive a device image of a home device uploaded by a home appliance manufacturer and establish the 3D model of the home device based on the device image. Then, the device model library apparatus 201 is configured to extract, from the 3D model, a preset device feature corresponding to the home device, store the extracted preset device feature to the device feature library 202, and establish an index between the home device and the preset device feature and store the index to the device feature library 202.

The device binding apparatus 203 is configured to obtain a preset environment feature of an environment in which a home device is located, associate and bind the obtained preset environment feature with a corresponding home device, and store the obtained preset environment feature to the environment feature library 204. That is, the device binding apparatus 203 is configured to perform feature detection and extraction on an obtained environment image (or environment video), to obtain the preset environment feature of the environment in which the home device is located, store the preset environment feature of the environment in which the home device is located to the environment feature library 204, and establish an index between the home device and the preset environment feature and store the index in the environment feature library 204.

The device connection management apparatus 206 is configured to maintain a communication connection with each home device, and is responsible for sending a control instruction to the home device, obtaining a device status corresponding to the home device, and synchronizing the device status corresponding to the home device to a device shadow 207 corresponding to the home device.

The device recognition apparatus 205 is configured to identify, with reference to the device feature library 202 and/or the environment feature library 204, an image obtained by a camera, to determine a to-be-controlled target home device. In addition, the device recognition apparatus 205 is further configured to recognize a selection operation performed by a user on a control menu corresponding to a home device in the image, and may generate a control instruction corresponding to the selection operation and send the control instruction to the device connection management apparatus 206, to send the control instruction to the home device by using the device connection management apparatus 206, so as to perform device control on the home device.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

It should be noted that content such as information exchange between the foregoing apparatuses/units and the execution processes thereof is based on a same concept as the method embodiments of this application. For specific functions and technical effects of the content, refer to the method embodiments. Details are not described herein again.

Persons skilled in the art may clearly understand that, for the purpose of convenient and brief description, division into the foregoing function units or modules is merely used as an example for description. In an actual application, the foregoing functions may be allocated to different function units or modules for implementation based on a requirement. That is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units or modules in the foregoing system, refer to a corresponding process in the foregoing method embodiments. Details are not described herein again.

An embodiment of this application further provides a terminal device. The terminal device includes at least one memory, at least one processor, and a computer program that is stored in the at least one memory and that can be run on the at least one processor. When the processor executes the computer program, the terminal device is enabled to implement the home device control method in any one of the foregoing method embodiments. For example, a structure of the terminal device may be shown in FIG. 1.

An embodiment of this application further provides a computer-readable storage medium. The computer-readable storage medium stores a computer program, and when the computer program is executed by a computer, the computer is enabled to implement the home device control method in any one of the foregoing method embodiments.

An embodiment of this application provides a computer program product. When the computer program product is run on a terminal device, the terminal device is enabled to implement the home device control method in any one of the foregoing method embodiments.

When the integrated unit is implemented in the form of the software function unit and sold or used as an independent product, the integrated unit may be stored in a computer-readable storage medium. Based on such an understanding, all or some of the processes of the method in embodiments of this application may be implemented by a computer program instructing relevant hardware. The computer program may be stored in a computer-readable storage medium. When the computer program is executed by a processor, steps of the foregoing method embodiments may be implemented. The computer program includes computer program code. The computer program code may be in a source code form, an object code form, an executable file form, some intermediate forms, or the like. The computer-readable storage medium may include at least any entity or apparatus that can carry computer program code to an apparatus/terminal device, a recording medium, a computer memory, a read-only memory (read-only memory. ROM), a random access memory (random access memory, RAM), an electrical carrier signal, a telecommunication signal, and a software distribution medium, for example, a USB flash drive, a removable hard disk, a magnetic disk, or an optical disk. In some jurisdictions, the computer-readable storage medium cannot be the electrical carrier signal or the telecommunication signal according to legislation and patent practices.

In the foregoing embodiments, descriptions of embodiments have respective focuses. For a part that is not described in detail or recorded in an embodiment, refer to related descriptions in other embodiments.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

In embodiments provided in this application, it should be understood that the disclosed apparatus/terminal device and method may be implemented in other manners. For example, the described apparatus/terminal device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application, and these modifications and replacements shall fall within the protection scope of this application.

What is claimed is:

1. A method implemented by a terminal device, wherein the method comprises:

obtaining a plurality of three-dimensional models of home devices, wherein the home devices comprise a target home device;

obtaining, for each of the three-dimensional models and from different angles, model images corresponding to each of the three-dimensional models;

inputting each of the model images and a corresponding device identifier of a home device corresponding to each of the model images into an initial neural network model for training and to obtain a trained neural network model;

obtaining an image corresponding to a target area;

inputting the image corresponding to the target area into the trained neural network model to obtain a device identifier;

determining the target home device based on the image and the device identifier;

obtaining a control menu corresponding to the target home device;

displaying the control menu in the image using augmented reality (AR) technology; and controlling, in response to a selection operation in the control menu, the target home device to execute a target control instruction corresponding to the selection operation.

2. The method of claim 1, further comprising:

performing device detection on the image to obtain a detected home device;

obtaining a device feature of the detected home device;

matching the device feature against a preset device feature in a device feature library to obtain a matching result; and further determining the target home device based on the matching result.

3. The method of claim 1, further comprising:

performing device detection on the image to obtain a detected home device;

obtaining a device feature of the detected home device;

obtaining an environment feature of an environment in which the detected home device is located;

matching the device feature against a preset device feature in a device feature library to obtain a first matching result;

matching the environment feature against a preset environment feature in an environment feature library to obtain a second matching result; and further determining the target home device based on the first matching result and the second matching result.

4. The method of claim 2, wherein before matching the device feature against the preset device feature, the method further comprises:

obtaining a plurality of three-dimensional models of home devices, wherein the home devices comprise the target home device;

obtaining, for each of the three-dimensional models and from different angles, model images corresponding to each of the three-dimensional models;

extracting a corresponding preset device feature from each of the model images; and establishing the device feature library based on the corresponding preset device feature corresponding to each of the model images.

5. The method of claim 1, further comprising:

obtaining an environment feature corresponding to the image;

matching the environment feature against a preset environment feature in an environment feature library to obtain a matching result; and further determining the target home device based on the matching result.

6. The method of claim 1, further comprising:

obtaining a device status corresponding to the target home device; and displaying the device status in the image using the AR technology.

7. The method of claim 1, further comprising:

sending the image to a cloud;

instructing the cloud to determine a target home device identifier based on the image; and sending the target home device identifier to the terminal device.

8. The method of claim 1, further comprising:

sending the device identifier to a cloud;

receiving, from the cloud and in response to the device identifier, a device capability description file; and generating, based on the device capability description file, the control menu.

9. A terminal device comprising:

a memory configured to store instructions; and a processor coupled to the memory and configured to execute the instructions to cause the terminal device to:

obtain an image corresponding to a target area;

obtain a plurality of three-dimensional models of home devices, wherein the home devices comprise a target home device;

obtain, for each of the three-dimensional models and from different angles, model images corresponding to each of the three-dimensional models;

input each of the model images and a corresponding device identifier of a home device corresponding to each of the model images into an initial neural network model to train and obtain a trained neural network model;

input the image into the trained neural network model to obtain a device identifier;

determine the target home device based on the image and the device identifier;

obtain a control menu corresponding to the target home device;

display the control menu in the image using an augmented reality (AR) technology; and control, in response to a selection operation in the control menu, the target home device to execute a target control instruction corresponding to the selection operation.

10. The terminal device of claim 9, wherein the processor is further configured to execute the instructions to cause the terminal device to:

perform device detection on the image to obtain a detected home device;

obtain a device feature of the detected home device;

match the device feature against a preset device feature in a device feature library to obtain a matching result; and further determine the target home device based on the matching result.

11. The terminal device of claim 9, wherein the processor is further configured to execute the instructions to cause the terminal device to:

perform device detection on the image to obtain a detected home device;

obtain a device feature of the detected home device;

obtain an environment feature of an environment in which the detected home device is located;

match the device feature against a preset device feature in a device feature library to obtain a first matching result;

match the environment feature against a preset environment feature in an environment feature library to obtain a second matching result; and further determine the target home device based on the first matching result and the second matching result.

12. The terminal device of claim 10, wherein before matching the device feature against the preset device feature, the processor is further configured to execute the instructions to cause the terminal device to:

obtain a plurality of three-dimensional models of home devices, wherein the home devices comprise the target home device;

obtain, for each of the three-dimensional models and from different angles, model images corresponding to each of the three-dimensional models;

extract a corresponding preset device feature from each of the model images; and establish the device feature library based on the corresponding preset device feature corresponding to each of the model images.

13. The terminal device of claim 9, wherein the processor is further configured to execute the instructions to cause the terminal device to:

obtain an environment feature corresponding to the image;

match the environment feature against a preset environment feature in an environment feature library to obtain a matching result; and further determine the target home device based on the matching result.

14. The terminal device of claim 9, wherein the processor is further configured to execute the instructions to cause the terminal device to:

obtain a device status corresponding to the target home device; and display the device status in the image using the AR technology.

15. The terminal device of claim 9, wherein the processor is further configured to execute the instructions to cause the terminal device to:

send the image to a cloud;

instruct the cloud to determine a target home device identifier based on the image; and send the target home device identifier to the terminal device.

16. The terminal device of claim 9, wherein the processor is further configured to execute the instructions to cause the terminal device to:

send the device identifier to a cloud receive, from the cloud and in response to the device identifier, a device capability description file;

send the device capability description file to the terminal device; and generate, based on the device capability description file, the control menu.

17. A computer program product comprising computer-executable instructions stored on a non-transitory computer-readable storage medium that, when executed by a processor, cause a terminal device to:

obtain an image corresponding to a target area;

obtain a plurality of three-dimensional models of home devices, wherein the home devices comprise a target home device;

obtain, for each of the three-dimensional models and from different angles, model images corresponding to each of the three-dimensional models;

input each of the model images and a corresponding device identifier of a home device corresponding to each of the model images into an initial neural network model to train and obtain a trained neural network model;

input the image into the trained neural network model to obtain a device identifier;

determine the target home device based on the image and the device identifier;

obtain a control menu corresponding to the target home device;

display the control menu in the image using an augmented reality (AR) technology; and control, in response to a selection operation in the control menu, the target home device to execute a target control instruction corresponding to the selection operation.

18. The computer program product of claim 17, wherein the computer-executable instructions further cause the terminal device to:

perform device detection on the image to obtain a detected home device;

obtain a device feature of the detected home device;

match the device feature against a preset device feature in a device feature library to obtain a matching result; and further determine the target home device based on the matching result.

19. The computer program product of claim 18, wherein the computer-executable instructions further cause the terminal device to:

obtain a plurality of three-dimensional models of home devices, wherein the home devices comprise the target home device;

obtain, for each of the three-dimensional models and from different angles, model images corresponding to each of the three-dimensional models;

extract a corresponding preset device feature from each of the model images; and establish the device feature library based on the corresponding preset device feature corresponding to each of the model images.

20. The computer program product of claim 17, wherein the computer-executable instructions further cause the terminal device to:

perform device detection on the image to obtain a detected home device;

obtain a device feature of the detected home device;

obtain an environment feature of an environment in which the detected home device is located;

match the device feature against a preset device feature in a device feature library to obtain a first matching result;

match the environment feature against a preset environment feature in an environment feature library to obtain a second matching result; and further determine the target home device based on the first matching result and the second matching result.

* * * * *